US010780358B1

(12) United States Patent
Smith

(10) Patent No.: US 10,780,358 B1
(45) Date of Patent: Sep. 22, 2020

(54) VIRTUAL REALITY ARENA SYSTEM

(71) Applicant: Intuitive Research and Technology Corporation, Huntsville, AL (US)

(72) Inventor: Jason Lamar Wayne Smith, Huntsville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 144 days.

(21) Appl. No.: 15/928,351

(22) Filed: Mar. 22, 2018

Related U.S. Application Data

(60) Provisional application No. 62/474,708, filed on Mar. 22, 2017.

(51) Int. Cl.
*A63F 13/98* (2014.01)
(52) U.S. Cl.
CPC ...... *A63F 13/98* (2014.09); *A63F 2300/8082* (2013.01)
(58) Field of Classification Search
CPC .................................................. A63F 13/98
See application file for complete search history.

(56) References Cited

U.S. PATENT DOCUMENTS

| | | | | |
|---|---|---|---|---|
| 5,443,260 A * | 8/1995 | Stewart | ............. | A63B 69/0002 473/421 |
| 5,577,981 A * | 11/1996 | Jarvik | ................. | A63B 21/154 434/247 |
| 5,846,134 A * | 12/1998 | Latypov | ................. | A63B 19/04 463/46 |
| 6,084,556 A * | 7/2000 | Zwern | .................. | G09B 21/008 345/158 |
| 2001/0035845 A1 * | 11/2001 | Zwern | .................. | G09B 21/008 345/8 |
| 2002/0128985 A1 * | 9/2002 | Greenwald | ........ | G06Q 30/0283 705/400 |
| 2009/0256800 A1 * | 10/2009 | Kaufman | ................ | G06F 3/011 345/156 |
| 2012/0223885 A1 * | 9/2012 | Perez | ...................... | G06F 3/011 345/158 |
| 2014/0100006 A1 * | 4/2014 | Jennings | .............. | A63B 71/022 463/3 |

* cited by examiner

*Primary Examiner* — David L Lewis
*Assistant Examiner* — Shauna-Kay Hall
(74) *Attorney, Agent, or Firm* — Angela Holt; Bradley Arant Boult Cummings LLP

(57) ABSTRACT

A virtual reality (VR) arena and related methods are disclosed. In one embodiment, the VR arena includes an enclosure and at least one support that is attached to the enclosure. The enclosure encloses a user action regions. Furthermore, the enclosure and at least one support define a wiring track around the enclosure. In this manner, a user can be maintained within the user action region while a VR system is in use by the enclosure. Additionally, the support(s) can be used to support the VR user device(s) while the wiring track can be used to maintain the wiring for the VR user device(s) out of the user action region.

19 Claims, 7 Drawing Sheets

US 10,780,358 B1

VIRTUAL REALITY ARENA SYSTEM

RELATED APPLICATIONS

This application claims the benefit of provisional patent application Ser. No. 62/474,708, filed Mar. 22, 2017, the disclosure of which is hereby incorporated herein by reference in its entirety.

FIELD OF THE DISCLOSURE

This disclosure relates generally to devices and methods for storing, mounting, and/or supporting virtual reality ("VR") systems.

BACKGROUND

Typically VR equipment is tethered to a computer or a gaming console by cables and/or the like. Some of this VR equipment is worn or held by the user while other VR equipment has to be positioned correctly in order to track a user's orientation and position. VR platforms provide a structure that can accommodate the VR equipment of a VR system so that the VR equipment can be used by a user. However, since the VR equipment is typically tethered by cables, there is a limited space in which the user can use the VR equipment relative to the VR platform. This space may be further limited because the tracking devices generally require that the user be within a certain spatial range relative to the tracking devices in order for the tracking devices to operate correctly. Unfortunately, a user is not able to see the VR platforms or the VR equipment while the VR system is in use. Furthermore, the cabling for the VR equipment can create an obstacle in the designated VR space. These deficiencies in known VR platforms create safety hazards for the user, can result in damage to the VR equipment, and can prevent the tracking devices from operating correctly.

With respect to the tracking devices, some VR platforms address this issue by mounting the tracking devices on speaker stands or similar devices. However, if the user bumps the speaker stands, the tracking devices can be reoriented or repositioned, thereby requiring a tracking recalibration. Additionally, in some known VR platforms, cables are run through ceiling-mounted rigs so that the cables for the VR equipment do not obstruct the user. However, these types of VR platforms are not portable but rather are fixed within a room or a building. Some VR systems address the boundaries of the designated VR space via software. For example, the VR system may provide a virtual indicator or alert so that the user is aware of the boundary. However, no physical structure actually constrains the user since the software can only provide virtual indicators and/or alerts to maintain the user within the designated VR space. Thus, a user can still bypass the boundaries, which can result in cables being stressed or users contacting objects outside of the designated VR space.

Accordingly, what is needed are portable structures and related methods for accommodating VR equipment while maintaining a user within a designated VR space and/or maintaining the designated VR space free from obstacles.

SUMMARY

A VR arena and related methods are disclosed. In one embodiment, the VR arena includes an enclosure and at least one support that is attached to the enclosure. The enclosure encloses a user action region. Furthermore, the enclosure and at least one support define a wiring track around the enclosure. In this manner, a user can be maintained within the user action region while a VR system is in use. Additionally, the support(s) can be used to support the VR user device(s) while the wiring track can be used to maintain the wiring for the VR user device(s) out of the user action region.

In another embodiment, a VR arena includes a set of enclosure rails and one or more supports. The set of enclosure rails are configured to be assembled into an enclosure that encloses a user action region. Furthermore, the support(s) are configured to be attached to the enclosure. The enclosure and the support(s) define a wiring track that extends through the enclosure and the support(s) when the enclosure is assembled and the support(s) are attached to the enclosure. The VR arena therefore may be portable since the VR arena may be assembled and disassembled. Furthermore, a user can be maintained within the user action region while a VR system is in use within the user action region and the wiring track can be used to maintain wiring for VR user device(s) out of the user action region.

In one embodiment of a method, a VR arena is provided that encloses a user action region and has a wiring track that extends through the VR arena. Wiring may be provided to extend through the wiring track. Furthermore, a VR computer and one or more VR user devices may be supported. The VR user devices may be connected to the VR computer with the wiring in the wiring track. In this manner, the support(s) are used to support the VR user device(s) while the wiring track is used to so that the wiring for the VR user device(s) does not create an obstruction.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Throughout this disclosure, relative terminology, such as "approximately," "substantially," "proximate" and the like, may be used in a predicate to describe features and relationships between features of a device or method. The relative terminology in the predicate should be interpreted sensu lato. However, whether the predicate employing the relative terminology is satisfied is determined in accordance to error ranges and/or variation tolerances that are relevant to the predicate and allow the feature or related features described by the predicate to perform their intended function.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Examples of VR arenas and related methods are disclosed. The VR arenas may include an enclosure that encloses a user action region and supports that are attached to the enclosure. The supports may be used to mount VR user devices, such as a VR headset, VR controllers, and VR tracking sensors. Furthermore, the enclosures can be designed so as to constrain a user to the user action region thereby preventing the user from bumping into the supports and the VR user devices. The enclosure and the supports define a wiring track that extends around the user action region. In this manner, wiring for the VR user devices can be routed through the wiring track so that the wiring is maintained out of the user action region.

Additionally, as explained in further detail below, the VR arenas may be modular and thus are capable of being disassembled. These modular VR arenas are portable and, in some implementations, are designed so as to break up into small enough sections such that the disassembled VR arenas are easily shipped. Furthermore, the modular VR arenas may be configured so that wiring in the wiring track can also be disassembled and thus the wiring does not have to be removed from the modular VR arenas during shipping.

Figure 1:
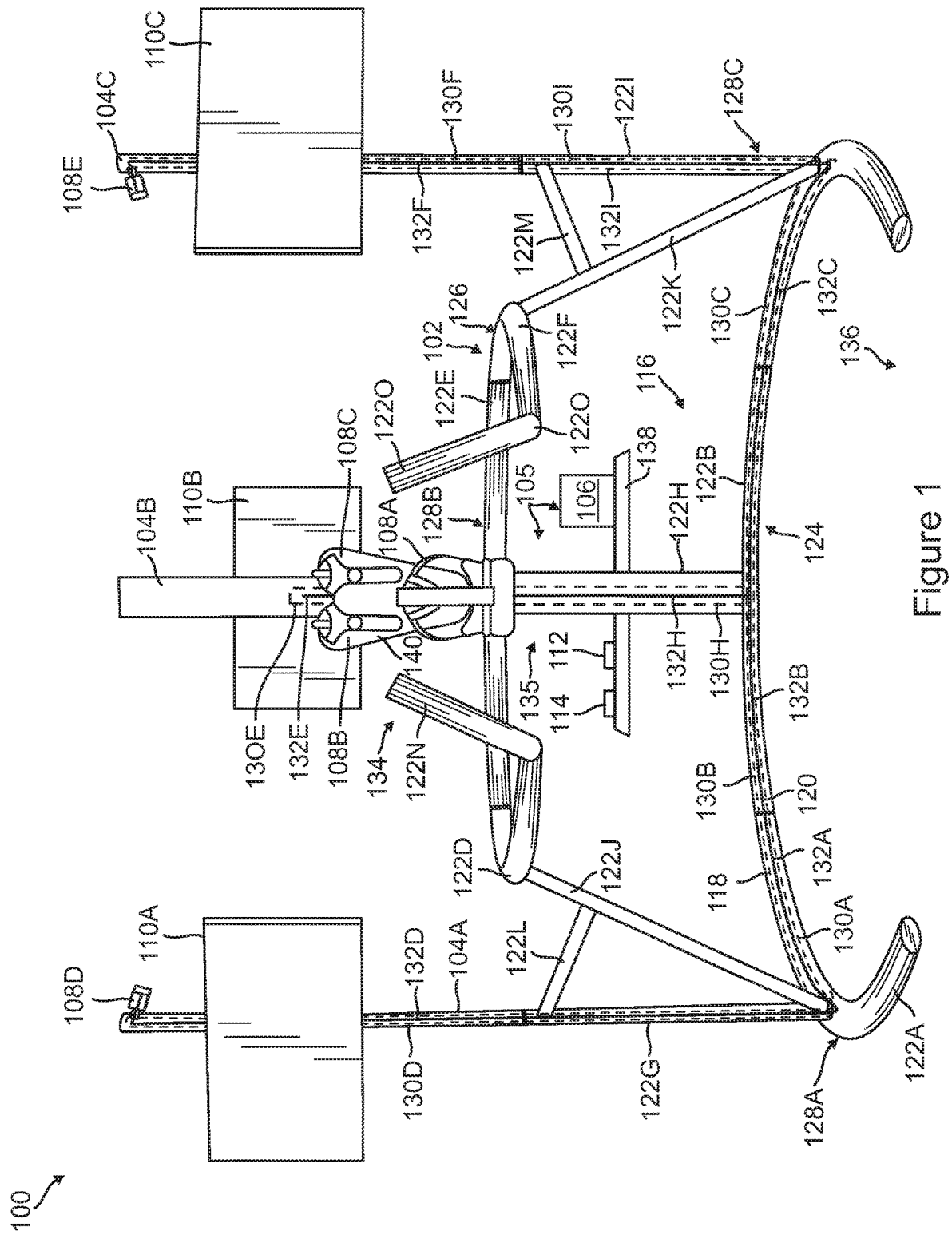
FIG. 1 illustrates an example of a VR arena.

FIG. 1 illustrates an exemplary VR arena 100. The VR arena 100 includes an enclosure 102 and supports 104A, 104B, 104C (referred to collectively or generically as support(s) 104) attached to the enclosure 102. In this example, a VR system 105 is included with the VR arena 100. The VR system 105 shown in FIG. 1 includes a VR computer 106 and various VR user devices 108A, 108B, 108C, 108D, 108E (referred to generically or collectively as VR user device(s) 108). More specifically, the VR system 105 includes a VR headset 108A, a VR controller 108B, a VR controller 108C, a VR tracking sensor 108D, and a VR tracking sensor 108E. Also included in the VR system 105 are monitors (referred to collectively or generically as monitor(s) 110 and specifically as monitor(s) 110A, 110B, 110C), a mouse 112, and a keyboard 114.

As explained in further detail below, the VR arena 100 shown in FIG. 1 is designed so that the VR user devices 108 are connected to the VR computer 106 in a nonobtrusive and inconspicuous manner. Furthermore, the enclosure 102 is also designed to restrain a user of the VR system 105 so that the user does not hit or damage the VR system 105. The supports 104 shown in FIG. 1 are also positioned and oriented so that the VR headset 108A and the VR controllers 108B, 108C are easily accessed by a user in the enclosure 102 and so that the VR tracking sensors 108D, 108E can detect the position and orientation of the VR headset 108A and the VR controllers 108B, 108C when the user is in the enclosure 102.

It should be noted that while the VR arena 100 shown in FIG. 1 includes a VR system 105, this may or may not be the case in alternative embodiments of the VR arena 100. For example, the VR arena 100 can be manufactured and shipped without the VR system 105. The VR system 105 may be bought separately and then mounted on the VR arena 100. In still other embodiments, only part of the VR system 105 may be included with the VR arena 100. For example, one or more of the VR computer 106, the VR user devices 108, the monitors 110, the mouse 112, and the keyboard 114 may be sold separately.

The VR system 105 shown in FIG. 1 is a type of VIVE™ VR system. More specifically, the VR user devices 108 are VIVE VR user devices and the VR computer 106 is a desktop computer that runs a VR application program interface (API) to control and communicate with VIVE VR user devices, like the VR user devices 108 shown in FIG. 1. In this manner, the VR computer 106 can implement VR applications (e.g. VR games, VR simulations, VR media, etc.) using the VIVE VR user devices, such as the VR user devices 108. However, it should be noted that alternative embodiments of the VR arena 100 may be designed for any type of VR system 105. For example, alternative embodiments of the VR system 105 include Oculus Rift® systems, PlayStation® VR systems, X Box® VR systems, Acer® VR systems, Samsung Odyssey® systems, and the like. Thus, in alternative embodiments, the VR computer 106 may be a gaming console, a laptop, a smartphone, a tablet, or the like.

Additionally, as explained in further detail below, the VR arena 100 shown in FIG. 1 is modular and is configured to be disassembled into different pieces. Thus, while the VR arena 100 is shown assembled in FIG. 1, the VR arena 100 may be sold and/or shipped disassembled. Alternative embodiments of the VR arena 100 may not be modular and incapable of disassembly. These and other configurations would be apparent to one of ordinary skill in the art in light of this disclosure.

Referring again to FIG. 1, the enclosure 102 encloses a user action region 116. The user action region 116 is an enclosed region that designates where user actions are to be performed when using the VR system 105. In this embodiment, the enclosure 102 has a height that is less than an average height of a human adult (e.g., around waist height of the average adult). The enclosure 102 is also designed so that the typical user (not shown) stands when in the enclosure 102. Accordingly, a human adult in the enclosure 102 would thus wear the VR headset 108A and hold the VR controllers 108B, 108C above the user action region 116. Nevertheless, the user action region 116 designates where user actions are to be performed when using the VR system 105. In this case, the user action region 116 designates where user actions are to be performed because the perimeter of user action region 116 defined by the enclosure 102 designates where a user can stand and how far the user can horizontally extend their limbs. Other embodiments of the enclosure 102 can enclose other types of user action regions so long as the enclosed regions designate where the user can perform actions when using the VR system 105.

Referring again to FIG. 1, the supports 104 are used to mount the VR user devices 108 so that the VR system 105 can be operated by a user in the user action region 116 enclosed by the enclosure 102. In this embodiment, each of the supports 104 is removeably attached to the enclosure 102. The supports 104 are also attached to the enclosure 102 outside and around the user action region 116 so that the supports 104 do not obstruct the user action region 116.

The supports 104 and the enclosure 102 define a wiring track 118 that extends through each of the supports 104 and the enclosure 102. In this manner, the VR computer 106 can be connected to the VR user devices 108 and the monitors 110 without obstructing the user action region 116. In this embodiment, the VR arena 100 includes wiring 120 that extends through the wiring track 118 and connects the VR computer 106 to each of the VR user devices 108 and the monitors 110.

The VR arena 100 shown in FIG. 1 is modular, which allows for the VR arena 100 to be disassembled. More specifically, the enclosure 102 is formed from a set of enclosure rails (referred to generically or collectively as enclosure rail(s) 122). The enclosure rails 122 shown in FIG. 1 include base rails (122A, 122B, 122C), guard rails (122D, 122E, 122F), mounting rails (122G, 122H, 122I), vertical support rails (122J, 122K), horizontal support rails (122L, 122M), and movable gate rails (122N, 122O). The enclosure rails 122 are configured to be assembled to form the enclosure 102.

As shown in FIG. 1, the enclosure 102 includes a base 124 and a barrier 126 that is mounted over the base 124. The base 124 is provided at the bottom of the enclosure 102 so that the base 124 rests on a floor or on the ground. The base 124 encloses a horizontal perimeter at the bottom of the user action region 116. The horizontal barrier 126 encloses a horizontal perimeter (not shown) of the user action region 116 above the base 124. The horizontal perimeter of the user action 116 enclosed by the barrier 126 is provided at a vertical height of the barrier 126 above the bottom of the base 124 (more specifically, the vertical height of a center line of the barrier 126 from the bottom of the base 124). In this embodiment, the horizontal perimeter defined by the base 124 is larger than the horizontal perimeter defined by the barrier 126.

The barrier 126 thereby prevents a user in the enclosure 102 from standing horizontally past the horizontal perimeter enclosed by the barrier 126 since a torso of the user would hit the barrier 126 if the user tried to move horizontally past the barrier 126. Furthermore, since the height of the barrier 126 is about waist high, the barrier 126 also prevents the user's legs from horizontally extending past the base 124.

In this embodiment, the base 124 includes the base rails 122A, 122B, 122C, wherein the base rails 122A, 122B, 122C are removeably attached to form the base 124. In addition, the barrier 126 includes the guard rails 122D, 122E, 122F, wherein the guard rails 122D, 122E, 122F are removeably attached to form the barrier 126. The mounting rails 122G, 122H, 122I are each attached to the base 124 so that each of the mounting rails 122G, 122H, 122I extend vertically out of the base 124. It should be noted that, in some embodiments, an AC cable/plug (not shown) be provided in the wiring 120 and extend out of the base 124 to connect to an outlet (not shown) that powers the VR system 105. Furthermore, the base rails 122A, 122B, 122C and the guard rails 122D, 122E, 122F may be removeably attached in any suitable manner. For example, slide mounting mechanism may be used to removeably attach the base rails 122A, 122B, 122C and the guard rails 122D, 122E, 122F. Additionally or alternatively, male and female coupling mechanisms, screws, bolts, braces, clips, and/or the like may be used to removeably attach the base rails 122A, 122B, 122C and the guard rails 122D, 122E, 122F.

More specifically, the mounting rail 122G is attached to and extends vertically out of the base rail 122A. The mounting rail 122G has a height approximately equal to the height of the guard rail 122D. The support 104A is removeably attached to the top of the mounting rail 122G and therefore extends vertically above the guard rail 122D. Furthermore, since the support 104A is attached to the mounting rail 122G, the support 104A is horizontally and vertically positioned outside of the user action region 116. In order to secure the guard rail 122D to the base rail 122A, the vertical support rail 122J is attached to the base rail 122A and the guard rail 122D so that the vertical support rail 122J extends between the base rail 122A and the guard rail 122D. Accordingly, in this embodiment, the vertical support rail 122J is slanted and extends along a vertical perimeter of the user action region 116 between the base rail 122A and the guard rail 122D. The horizontal support rail 122L is attached to the mounting rail 122G and the vertical support rail 122J in order to help support the vertical support rail 122J. Since the base rail 122A is removeably attached to the base rail 122B and since the guard rail 122D is removeably attached to the guard rail 122E, the base rail 122A, the guard rail 122D, the mounting rail 122G, the vertical support rails 122J, and the horizontal support rail 122L form an enclosure section 128A of the enclosure 102, wherein the enclosure section 128A is removeably attached when the enclosure 102 is assembled (as shown in FIG. 1).

The mounting rail 122H is attached to and extends vertically out of the base rail 122B. The mounting rail 122H has a height approximately equal to the height of the guard rail 122E. The support 104B is removeably attached to the top of the mounting rail 122H and therefore extends vertically above the guard rail 122E. Furthermore, since the support 104B is attached to the mounting rail 122H, the support 104B is horizontally and vertically positioned outside of the user action region 116. In order to secure the guard rail 122E to the base rail 122B, a vertical support rail (not shown for the sake of clarity) is attached to the base rail 122B and the guard rail 122E so that the vertical support rail extends between the base rail 122B and the guard rail 122E. Accordingly, in this embodiment, this vertical support rail is slanted and extends along a vertical perimeter of the user action region 116 between the base rail 122B and the guard rail 122E. A horizontal support rail (not shown for the sake of clarity) is attached to the mounting rail 122H and the vertical support rail in order to help support the vertical support rail. Since the base rail 122B is removeably attached to both the base rail 122A and the base rail 122C and since the guard rail 122E is removeably attached to both the guard rail 122D and the guard rail 122F, the base rail 122B, the guard rail 122E, the mounting rail 122H, the vertical support rail (not shown) and the horizontal support rail (not shown) form an enclosure section 128B of the enclosure 102, wherein the enclosure section 128B is removeably attached when the enclosure 102 is assembled (as shown in FIG. 1).

In addition, the mounting rail 122I is attached to and extends vertically out of the base rail 122C. The mounting rail 122I has a height approximately equal to the height of the guard rail 122F. The support 104C is removeably attached to the top of the mounting rail 122I and therefore extends vertically above the guard rail 122F. Furthermore, since the support 104C is attached to the mounting rail 122I, the support 104C is horizontally and vertically positioned outside of the user action region 116. In order to secure the guard rail 122F to the base rail 122C, the vertical support rail 122K is attached to the base rail 122C and the guard rail 122F so that the vertical support rail 122K extends between the base rail 122C and the guard rail 122F. Accordingly, in this embodiment, the vertical support rail 122K is slanted and extends along a vertical perimeter of the user action region 116 between the base rail 122C and the guard rail 122F. The horizontal support rail 122M is attached to the mounting rail 122I and the vertical support rail 122K in order to help support the vertical support rail 122K. Since the base rail 122C is removeably attached to the base rail 122B and since the guard rail 122F is removeably attached to the guard rail 122E, the base rail 122C, the guard rail 122F, the mounting rail 122I, the vertical support rail 122K and the horizontal support rail 122M form an enclosure section 128C of the enclosure 102, wherein the enclosure section 128C is removeably attached when the enclosure 102 is assembled (as shown in FIG. 1).

The mounting rails 122G, 122H, 122I and the supports 104A, 104B, 104C may be removeably attached in any suitable manner. For example, slide mounting mechanism may be used to removeably attached the mounting rails 122G, 122H, 122I and the supports 104A, 104B, 104C. Additionally or alternatively, male and female coupling mechanisms, screws, bolts, braces, clips, and/or the like may be used to removeably attach the mounting rails 122G, 122H, 122I and the supports 104A, 104B, 104C.

The VR arena 100 may be sold or shipped with the set of enclosure rails 122 disassembled and the supports 104 detached. The set of enclosure rails 122 are configured to be assembled into the enclosure 102 and the supports 104 are configured to be attached to the enclosure 102 as described above. Accordingly, the set of enclosure rails 122 and the supports 104 may be assembled into the VR arena 100, as shown in FIG. 1, upon arrival at a desired locale. For example, VR arena 100 may be sold or shipped with the enclosure sections 128A, 128B, 128C disassembled with the supports 104 detached. In this manner, the VR arena 100 can be shipped in smaller pieces, which may be required by many commercial shipping companies. Once the VR arena 100 reaches its destination, the enclosure sections 128A, 128B, 128C may be removeably attached to form the enclosure 102 and the supports 104 may be removeably attached to the mounting rails 122G, 122H, 122I in order to assemble the VR arena 100.

As shown in FIG. 1, the enclosure 102 and the supports 104 define the wiring track 118, which extends around the user action region 116 through the enclosure 102 and the supports 104. In this embodiment, the wiring track 118 extends through each of the supports 104, through each of the mounting rails 122G, 122H, 122I, and through each of the base rails 122A, 122B, 122C. Furthermore, the wiring 120 extends through wiring track 118 so as to be connected the VR user devices 108 and the monitors 110 to the VR computer 106. The wiring track 118 thus routes the wiring 120 around the user action region 116 so that the wiring 120 does not obstruct the user action region 116.

However, since the VR arena 100 shown in FIG. 1 is modular, the wiring track 118 includes wiring passages (referred to collectively or generically as wiring passage(s) 130 and specifically as wiring passage(s) 130A-130I). Furthermore, the exemplary wiring 120 shown in FIG. 1 includes wiring segments (referred to collectively or generically as wiring segment(s) 132 and specifically as wiring segment(s) 132A-132I) that are connected to form the wiring 120. Each of these wiring segments 132 is configured to be disconnected, as explained in further detail below. Thus, the wiring 120 does not have to be removed when the VR arena 100 is disassembled.

More specifically, the enclosure section 128A defines the wiring passage 130A and the wiring segment 132A extends through the wiring passage 130A. The wiring segment 132A is configured to be disconnected when the enclosure section 128A is detached from the enclosure 102. For example, the wiring segment 132A may include one or more connectors that connect the wiring segment 132A and are accessible to be disconnected when the enclosure section 128A is detached. In this embodiment, the base rail 122A defines the wiring passage 130A where the wiring passage 130A extends through the base rail 122A. It should be noted that in alternative embodiments, the wiring passage 130A may instead be defined by the guard rail 122D so that the wiring passage 130A extends through the guard rail 122D. The base rail 122A is hollow in this embodiment and thus the wiring passage 130A is provided by the hollow passage inside the base rail 122A.

The enclosure section 128B defines the wiring passage 130B and the wiring segment 132B extends through the wiring passage 130B. The wiring segment 132B is configured to be disconnected when the enclosure section 128B is detached from the enclosure 102. For example, the wiring segment 132B may include one or more connectors that connect the wiring segment 132B and are accessible to be disconnected when the enclosure section 128B is detached. In this embodiment, the base rail 122B defines the wiring passage 130B where the wiring passage 130B extends through the base rail 122B. It should be noted that in alternative embodiments, the wiring passage 130B may instead be defined by the guard rail 122E so that the wiring passage 130B extends through the guard rail 122E. The base rail 122B is hollow in this embodiment and thus the wiring passage 130B is provided by the hollow passage inside the base rail 122B.

The enclosure section 128C defines the wiring passage 130C and the wiring segment 132C extends through the wiring passage 130C. The wiring segment 132C is configured to be disconnected when the enclosure section 128C is detached from the enclosure 102. For example, the wiring segment 132C may include one or more connectors that connect the wiring segment 132C and are accessible to be disconnected when the enclosure section 128C is detached. In this embodiment, the base rail 122C defines the wiring passage 130C where the wiring passage 130C extends through the base rail 122C. It should be noted that in alternative embodiments, the wiring passage 130C may instead be defined by the guard rail 122F so that the wiring passage 130B extends through the guard rail 122F. The base rail 122C is hollow in this embodiment and thus the wiring passage 130C is provided by the hollow passage inside the base rail 122C.

The support 104A defines the wiring passage 130D where the wiring passage 130D extends through the support 104A. The wiring segment 132D extends through the wiring passage 130D. The wiring segment 132D is configured to be disconnected when the support 104A is detached from the enclosure 102. For example, the wiring segment 132D may include one or more connectors that connect the wiring segment 132D and are accessible to be disconnected when the support 104A is detached from the mounting rail 122G of the enclosure 102. The support 104A is hollow in this embodiment and thus the wiring passage 130D is provided by the hollow passage inside the support 104A.

The support 104B defines the wiring passage 130E where the wiring passage 130E extends through the support 104B. The wiring segment 132E extends through the wiring passage 130E. The wiring segment 132E is configured to be disconnected when the support 104B is detached from the enclosure 102. For example, the wiring segment 132E may include one or more connectors that connect the wiring segment 132E and are accessible to be disconnected when the support 104B is detached from the mounting rail 122H of the enclosure 102. The support 104B is hollow in this embodiment and thus the wiring passage 130E is provided by the hollow passage inside the support 104B.

The support 104C defines the wiring passage 130F where the wiring passage 130F extends through the support 104C. The wiring segment 132F extends through the wiring passage 130F. The wiring segment 132F is configured to be disconnected when the support 104C is detached from the enclosure 102. For example, the wiring segment 132F may include one or more connectors that connect the wiring segment 132F and are accessible to be disconnected when the support 104C is detached from the mounting rail 122I of the enclosure 102. The support 104C is hollow in this embodiment and thus the wiring passage 130F is provided by the hollow passage inside the support 104C.

The mounting rail 122G defines the wiring passage 130G where the wiring passage 130G extends through the mounting rail 122G. The wiring segment 132G extends through the wiring passage 130G. The wiring segment 132G is configured to be disconnected when the support 104A is detached from the enclosure 102. For example, the wiring segment 132G may include one or more connectors that connect the wiring segment 132G and are accessible to be disconnected when the support 104A is detached from the mounting rail 122G of the enclosure 102. The mounting rail 122G is hollow in this embodiment and thus the wiring passage 130G is provided by the hollow passage inside the mounting rail 122G.

The mounting rail 122H defines the wiring passage 130H where the wiring passage 130H extends through the mounting rail 122H. The wiring segment 132H extends through the wiring passage 130H. The wiring segment 132H is configured to be disconnected when the support 104B is detached from the enclosure 102. For example, the wiring segment 132H may include one or more connectors that connect the wiring segment 132H and are accessible to be disconnected when the support 104B is detached from the mounting rail 122H of the enclosure 102. The mounting rail 122H is hollow in this embodiment and thus the wiring passage 130H is provided by the hollow passage inside the mounting rail 122H.

The mounting rail 122I defines the wiring passage 130I where the wiring passage 130I extends through the mounting rail 122I. The wiring segment 132I extends through the wiring passage 130I. The wiring segment 132I is configured to be disconnected when the support 104C is detached from the enclosure 102. For example, the wiring segment 132I may include one or more connectors that connect the wiring segment 132I and are accessible to be disconnected when the support 104C is detached from the mounting rail 122I of the enclosure 102. The mounting rail 122I is hollow in this embodiment and thus the wiring passage 130I is provided by the hollow passage inside the mounting rail 122I.

Since the wiring 120 shown in FIG. 1 can be disassembled by disconnecting each of the wiring segments 132, the VR arena 100 can be more easily shipped with the wiring segments 132 within the wiring passages 130. Furthermore, the VR arena 100 may be sold in a disassembled manner with the wiring 120. A user simply would connect the wiring segments 132 during assembly. However, it should be noted that some embodiments of the VR arena 100 may not include the wiring 120 when sold or shipped. Furthermore, as mentioned above, alternative embodiments of the VR arena 100 are not modular but instead all of the components may be rigidly connected or integrated into one another. Accordingly, other embodiments of the wiring 120 may not be capable of being disconnected into the wiring segments 132 and/or the wiring 120 may be fixed within the wiring track 118. These and other embodiments would be apparent to one of ordinary skill in the art in light of this disclosure.

In FIG. 1, the barrier 126 also includes a gate 134 configured to be opened and closed. Accordingly, the barrier 126 further includes movable gate rails 122N, 122O to form the gate 134. More specifically, the guard rails 122D, 122E, 122F are shaped so as to form an open loop when the guard rails 122D, 122E, 122F are removeably attached. Thus, the open loop has a gap 135 between one end of the guard rail 122D and one end of the guard rail 122F, where the gap 135 is diametrically opposed to the guard rail 122E. The movable gate rail 122N is movably attached to the end of the guard rail 122A at the gap 135 and the movable gate rail 122O is movably attached to the guard rail 122C at the gap 135. The movable gate rail 122N and the movable gate rail 122O are movable into the gap 135 so as to close the open loop when the gate 134 is closed and are movable out of the gap 135 so that a user can enter or exit the user action region 116. In this example, the base 124 also forms an open loop when the base rails 122A, 122B, 122C are attached so as to form a gap 136 between one end of the base rail 122A and one end of the base rail 122C. In this manner, a user does not have to step over the base 124 when entering the user action region 116.

In the example shown in FIG. 1, the barrier 126 formed by the guard rails 122D, 122E, 122F, 122N, 122O, 122F is modular guard rail that encloses a circular perimeter of the user action region 116 above the base 124. The circular perimeter enclosed by the modular guard rail is entirely enclosed when the gate 134 is closed but is only partially enclosed when the gate 134 is open due to the gap 135. Furthermore, the base 124 is formed by the guard rails 122A, 122B, 122C to form a modular base rail that encloses a circular perimeter at the bottom of the user action region 116. The circular perimeter enclosed by the modular base rail is partially enclosed. In this example, a radius of the circular perimeter enclosed by the modular base rail is greater than a radius of the circular perimeter enclosed by the modular guard rail. Therefore, the user action region 116 enclosed by the enclosure 102 is conic.

With regard to the enclosure 102, the enclosure section 128B is removeably attached between the enclosure sections 128A, 128C. The enclosure sections 128A, 128C are furthermore symmetric with respect the (central) enclosure section 128B and relative to the user action region 116. More specifically, the enclosure sections 128A, 128C have mirror symmetry.

In this embodiment, the VR arena 100 includes a computer support structure 138 configured to support the VR computer 106. In this embodiment, the computer support structure 138 is a computer shelf and the VR computer 106, along with the mouse 112 and the keyboard 114, are resting on the computer support structure 138. The computer support structure 138 is mounted to the enclosure 102 and, in this embodiment, the computer support structure 138 is mounted to mounting rail 122H. The computer support structure 138 may be mounted to be accessible outside the user action region 116 and/or so that the computer support structure 138 does not obstruct the user action region 116. For example, the computer support structure 138 shown in FIG. 1 is mounted so that the computer support structure 138 extends horizontally from the back of the mounting rail 122H so that the front of the computer support structure 138 faces away from the user action region 116.

Furthermore, a mount 140 is mounted to the support 104B. Also, the monitor 110B is mounted to the support 104B. In this example, the support 104B is also a vertical mounting rail. The mount 140 is configured to support the VR headset 108A and the VR controllers 108B, 108C. In this embodiment, the VR head set 108A and the VR controllers 108B, 108C may be suspended on the mount when the VR system 105 is not in use. The wiring segments 132E, 132H of the wiring 120 connects the VR headset 108A, the VR controller 108B, 108C, and the monitor 110B to the VR computer 106 and the wiring passages 130E, 132H of the wiring track 118 ensures that the wiring segments 132E, 132H are provided around the user action region 116 so as not to provide an obstruction to a user.

With regard to the VR tracking sensor 108D, 108E, the VR tracking sensor 108D is mounted to the support 104A while the VR tracking sensor 108E is mounted to the support 104C. In addition, the monitor 110A is mounted to the support 104A while the monitor 110C is mounted to the support 104C. As mentioned above, the enclosure sections 128A, 128C are symmetric with respect the (central) enclosure section 128B and relative to the user action region 116. Furthermore, the supports 104A, 104C are both vertical mounting rails of the same height. The supports 104A, 104C are mounted to the mounting rails 122G, 122I, respectively. Thus, the supports 104A, 104C are positioned symmetrically with respect to the (central) enclosure section 128B and relative to the user action region 116. In this embodiment, the supports 104A, 104C are positioned to have mirror symmetry. Accordingly, if one were to draw a reference line from the middle of user action region 116 to the mounting rail 122H, an angle between the horizontal position of the support 104A and the reference line and an angle between the horizontal position of the support 104C and the reference line would have the same magnitude but opposite polarity. As shown in FIG. 1, the VR tracking sensor 108D is mounted at the top of the support 104A and the VR tracking sensor 108E is mounted at the top of the support 104C. The VR tracking sensor 108D is connected to the wire segment 132D and the VR tracking sensor 108E is connected to the wire segment 132F. Furthermore, both of the VR tracking sensors 108D, 108E are mounted so as to face the center of the user action regions 116. In this manner, the supports 104A, 104C may be positioned so as to optimize the tracking operation of the VR tracking sensors 108D, 108E, which in this example are lighthouse tracking sensors for the VIVE VR system 105.

Alternative embodiments of the VR arena 100 may use other symmetric arrangements and/or a different number of supports 104, or a different type of support 104. For example, other types of VR systems may use triangularization techniques and thus supports (like the supports 104) may have horizontal positions that are one hundred and twenty degrees apart with respect to the user action region 116. These and other arrangements would be apparent to one of ordinary skill in the art in light of this disclosure.

Figure 2:
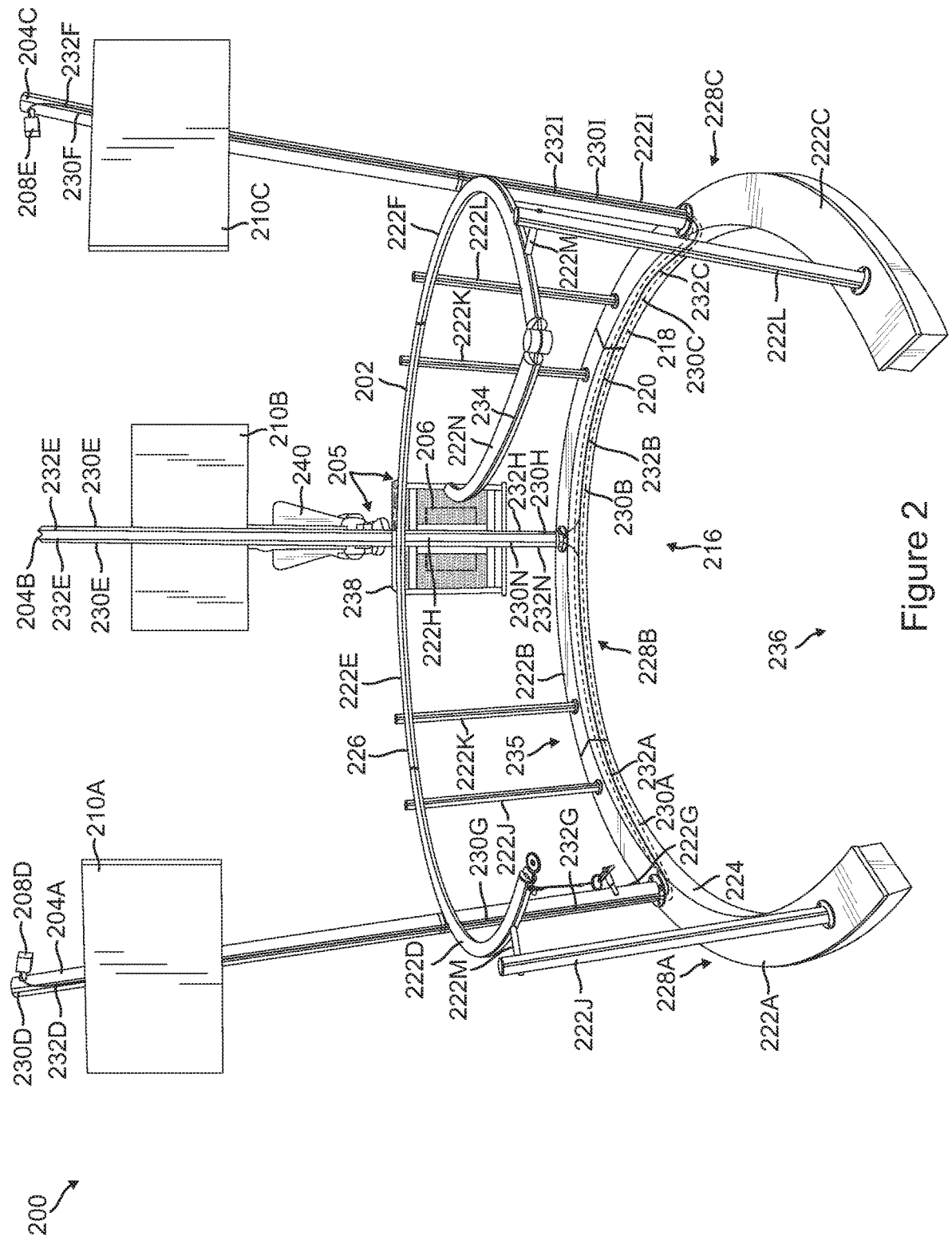
FIG. 2 illustrates another example of a VR arena.
Figure 3:
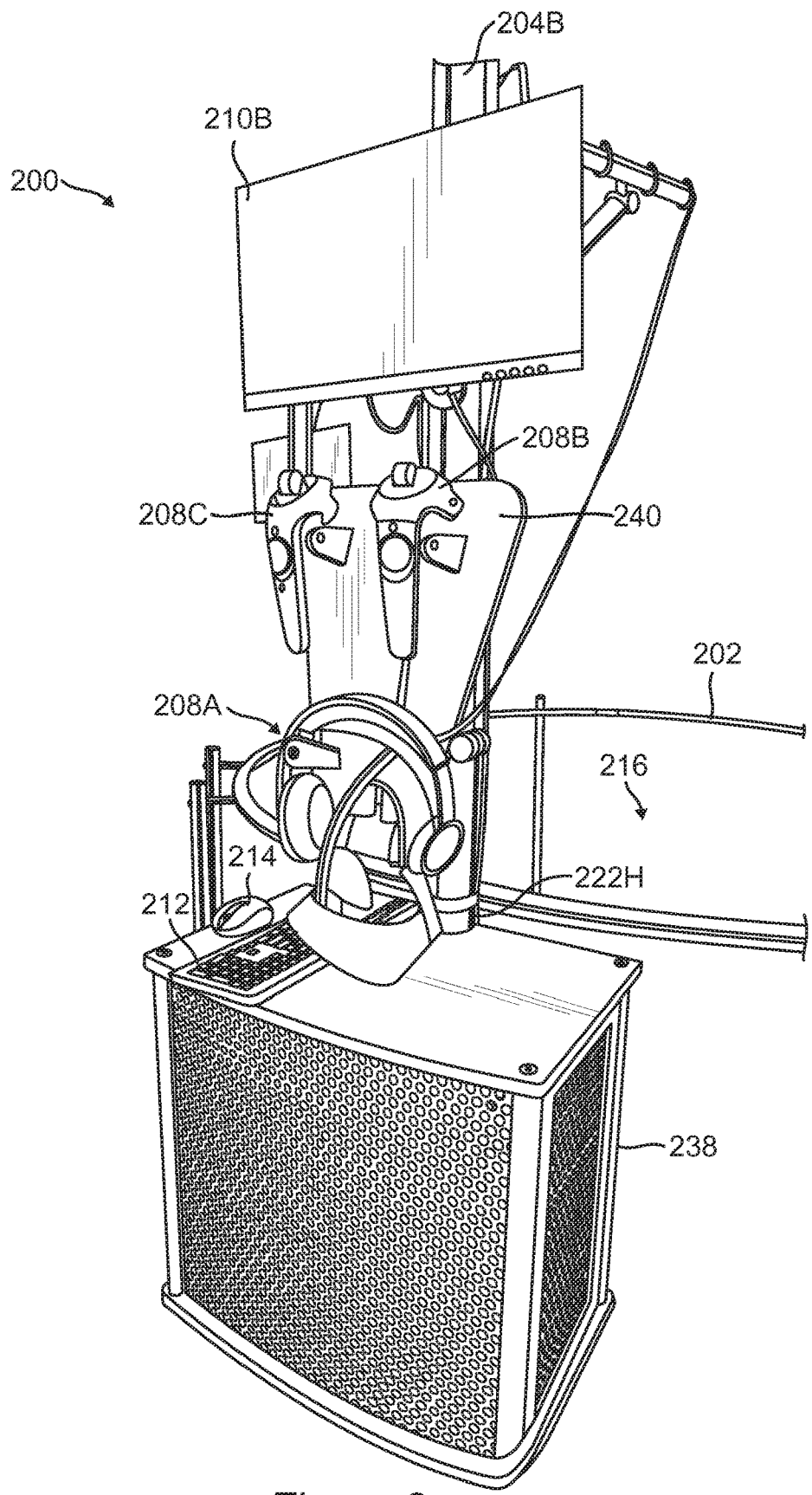
FIG. 3 illustrates one embodiment of a computer support structure and a mount for a VR headset and VR controllers where the computer support structure is attached to an exemplary mounting rail and the mount is attached to an exemplary support of the VR arena shown in FIG. 2.

Referring now to FIG. 2 and FIG. 3, FIG. 2 illustrates another exemplary VR arena 200. The VR arena 200 includes an enclosure 202 and supports 204A, 204B, 204C (referred to collectively or generically as support(s) 204) attached to the enclosure 202. In this example, a VR system 205 is included with the VR arena 200. The VR system 205 shown in FIG. 2 includes a VR computer 206 and various VR user devices 208A, 208B, 208C, 208D, 208E (referred to generically or collectively as VR user device(s) 208). More specifically, the VR system 205 includes a VR headset 208A, a VR controller 208B, a VR controller 208C, a VR tracking sensor 208D, and a VR tracking sensor 208E. Also included in this VR system 205 are monitors (referred to collectively or generically as monitor(s) 210 and specifically as monitor(s) 210A, 210B, 210C), a mouse 212, and a keyboard 214.

As explained in further detail below, the VR arena 200 shown in FIG. 2 and FIG. 3 is designed so that the VR user devices 208 are connected to the VR computer 206 in a nonobtrusive and inconspicuous manner. Furthermore, the enclosure 202 is also designed to restrain a user of the VR system 205 so that the user does not hit or damage the VR system 205. The supports 204 shown in FIG. 2 are also positioned and oriented so that the VR headset 208A and the VR controllers 208B, 208C are easily accessed by a user in the enclosure 202 and so that the VR tracking sensors 208D, 208E can detect the position and orientation of the VR headset 208A and the VR controllers 208B, 208C when a user is in the enclosure 202. In this embodiment, the VR headset 208A includes headphones, which are attached so as to be connected as part of the VR headset 208A. In other embodiment, headphones may be provided and connected separately to the VR computer 206.

It should be noted that while the VR arena 200 shown in FIG. 2 includes a VR system 205, this may or may not be the case in alternative embodiments of the VR arena 200. For example, the VR arena 200 can be manufactured and shipped without the VR system 205. The VR system 205 may be bought separately and then mounted on the VR arena 200. In still other embodiments, only part of the VR system 205 may be included with the VR arena 200. For example, one or more of the VR computer 206, the VR user devices 208, the monitors 210, the mouse 212, and the keyboard 214 may be sold separately.

The VR system 205 shown in FIG. 2 is a type of VIVE™ VR system. More specifically, the VR user devices 208 are VIVE VR user devices and the VR computer 206 is a desktop computer that runs a VR (API) to control and communicate with VIVE VR user devices, like the VR user devices 208 shown in FIG. 2. In this manner, the VR computer 206 can implement VR applications (e.g. VR games, VR simulations, VR media, etc.) using the VIVE VR user devices, such as the VR user devices 208. However, it should be noted that alternative embodiments of the VR arena 200 may be designed for any type of VR system. For example, alternative embodiments of the VR system 205 include Oculus Rift® systems, PlayStation® VR systems, X Box® VR systems, Acer® VR systems, Samsung Odyssey® systems, and the like. Thus, in alternative embodiments, the VR computer 206 may be a gaming console, a laptop, a smartphone, a tablet, or the like.

Additionally, as explained in further detail below, the VR arena 200 shown in FIG. 2 is modular and is configured to be disassembled into different pieces. Thus, while the VR arena 200 is shown assembled in FIG. 2, the VR arena 200 may be sold and/or shipped disassembled. Alternative embodiments of the VR arena 200 may not be modular and incapable of disassembly. These and other configurations would be apparent to one of ordinary skill in the art in light of this disclosure.

Referring again to FIG. 2, the enclosure 202 encloses a user action region 216. The user action region 216 is an enclosed region that designates where user actions are to be performed when using the VR system 205. In this embodiment, the enclosure 202 has a height that is less than an average height of a human adult (e.g., around waist height of the average adult). The enclosure 202 is also designed so that the user can move throughout the enclosure 202. Thus, unlike the enclosure 102 shown in FIG. 1, the user region 216 enclosed by the enclosure 202 shown in FIG. 2 allows for a user to walk around. In addition, a user sitting in a wheelchair would also be able to fit in the user action region 216. However, a human adult in the enclosure 202 could stand in the user action region 216 so that the VR headset 208A is worn and the VR controllers 208B, 208C are held above the user action region 216. Nevertheless, the user action region 216 designates where user actions are to be performed when using the VR system 205. In this case, the user action region 216 designates where user actions are to be performed because the perimeter of user action region 216 defined by the enclosure 202 designates where a user can be located while using the VR system 205. Other embodiments of the enclosure 202 can enclose other types of user action regions so long as the enclosed regions designate where the user can perform actions when using the VR system 205.

Referring again to FIG. 2, the supports 204 are used to mount the VR user devices 208 so that the VR system 205 can be operated by a user in the user action region 216 enclosed by the enclosure 202. In this embodiment, each of the supports 204 is removeably attached to the enclosure 202. The supports 204 are also attached to the enclosure 202 outside and around the user action region 216 so that the supports 204 do not obstruct the user action region 216.

The supports 204 and the enclosure 202 define a wiring track 218 that extends through each of the supports 204 and the enclosure 202. In this manner, the VR computer 206 can be connected to the VR user devices 208 and the monitors 210 without obstructing the user action region 216. In this embodiment, the VR arena 200 includes wiring 220 that extends through the wiring track 218 and connects the VR computer 206 to each of the VR user devices 208 and the monitors 210.

In this embodiment, the VR arena 200 is modular, which allows for the VR arena 200 to be disassembled. More specifically, the enclosure 202 is formed from a set of enclosure rails (referred to generically or collectively as enclosure rail(s) 222). The enclosure rails 222 shown in FIG. 2 include base rails (222A, 222B, 222C), guard rails (222D, 222E, 222F), mounting rails (222G, 222H, 222I), vertical support rails (222J, 222K, 222L), horizontal pin rails (222M), and a movable gate rail (222N). The enclosure rails 222 are configured to be assembled to form the enclosure 202.

As shown in FIG. 2, the enclosure 202 includes a base 224 and a horizontal barrier 226 that is mounted over the base 224. The base 224 is provided at the bottom of the enclosure 202 so that the base 224 rests on a floor or on the ground. The base 224 encloses a horizontal perimeter at the bottom of the user action region 216. The horizontal barrier 226 encloses a horizontal perimeter of the user action region 216 above the base 224. The horizontal perimeter of the user action 216 enclosed by the barrier 226 is provided at a vertical height of the barrier 226 above the bottom of the base 224 (more specifically, the vertical height of a center line of the barrier 226 from the bottom of the base 224). In this embodiment, the horizontal perimeter defined by the base 224 is approximately the same size as the horizontal perimeter defined by the barrier 226.

The barrier 226 thereby prevents a user in the enclosure 202 from standing horizontally past the horizontal perimeter enclosed by the barrier 226 since a torso of the user would hit the barrier 226 if the user tried to move horizontally past the barrier 226. Furthermore, in this embodiment, the horizontal perimeter enclosed by the barrier 226 is circular and the horizontal perimeter enclosed by the base 224 is circular. Thus, the user action region 216 is cylindrical. In other embodiments, the horizontal perimeters of the base 224 and the barrier 226 may be any shape depending on the desired shape of the user action region 216 to be enclosed by the enclosure 202.

In this embodiment, the base 224 includes the base rails 222A, 222B, 222C, wherein the base rails 222A, 222B, 222C are removeably attached to form the base 224. In addition, the barrier 226 includes the guard rails 222D, 222E, 222F, wherein the guard rails 222D, 222E, 222F are removeably attached to form the barrier 226. The mounting rails 222G, 222H, 222I are each attached to the base 224 so that each of the mounting rails 222G, 222H, 222I extend vertically out of the base 224.

It should be noted that, in some embodiments, an AC cable/plug (not shown) be provided in the wiring 220 and extend out of the base 224 to connect to an outlet (not shown) that powers the VR system 205. Furthermore, the base rails 222A, 222B, 222C and the guard rails 222D, 222E, 222F may be removeably attached in any suitable manner. For example, a slide mounting mechanism may removeably attached the base rails 222A, 222B, 222C and the guard rails 222D, 222E, 222F. Additionally or alternatively, male and female coupling mechanisms, screws, bolts, braces, clips, and/or the like may be used to removeably attach the base rails 222A, 222B, 222C and the guard rails 222D, 222E, 222F.

More specifically, the mounting rail 222G is attached to and extends vertically out of the base rail 222A. The mounting rail 222G has a height approximately equal to the height of the guard rail 222D. The support 204A is removeably attached to the top of the mounting rail 222G and therefore extends vertically above the guard rail 222D. Furthermore, since the support 204A is attached to the mounting rail 222G, the support 204A is horizontally and vertically positioned outside of the user action region 216. In order to secure the guard rail 222D to the base rail 222A, two vertical support rails 222J are attached near opposite ends of the base rail 222A and near opposite ends of the guard rail 222D so that the vertical support rails 222J extend between the base rail 222A and the guard rail 222D. Horizontal pin rails 222M extend horizontally so as to connect the guard rail 222D to the vertical support rails 222J. This allows for the guard rail 222D to be substantially aligned with an inner edge of the base rail 222A while the vertical support rails 222J and the mounting rail 222G are attached closer to the outer edge of the base rail 222A. Since the base rail 222A is removeably attached to the base rail 222B and since the guard rail 222D is removeably attached to the guard rail 222E, the base rail 222A, the guard rail 222D, the mounting rail 222G, the vertical support rail 222J and two of the horizontal pin rail 222M form an enclosure section 228A of the enclosure 202, wherein the enclosure section 228A is removeably attached when the enclosure 202 is assembled (as shown in FIG. 2).

The mounting rail 222H is attached to and extends vertically out of the base rail 222B. The mounting rail 222H has a height approximately equal to the height of the guard rail 222E. The support 204B is removeably attached to the top of the mounting rail 222H and therefore extends vertically above the guard rail 222E. Furthermore, since the support 204B is attached to the mounting rail 222H, the support 204B is horizontally and vertically positioned outside of the user action region 216. In order to secure the guard rail 222E to the base rail 222B, two vertical support rails 222K are attached near opposite ends of the base rail 222B and near opposite ends of the guard rail 222E so that the vertical support rails 222K extend between the base rail 222B and the guard rail 222E. Horizontal pin rails 222M (not expressly shown in FIG. 2) extend horizontally so as to connect the guard rail 222E to the vertical support rails 222K. This allows for the guard rail 222E to be substantially aligned with an inner edge of the base rail 222B while the vertical support rails 222K and the mounting rail 222H are attached closer to the outer edge of the base rail 222B. Since the base rail 222B is removeably attached to the base rails 222A, 222C and since the guard rail 222E is removeably attached to the guard rails 222D, 222F, the base rail 222B, the guard rail 222E, the mounting rail 222H, the vertical support rail 222K and two of the horizontal support rail 222M form an enclosure section 228B of the enclosure 202, wherein the enclosure section 228A is removeably attached when the enclosure 202 is assembled (as shown in FIG. 2).

In addition, the mounting rail 222I is attached to and extends vertically out of the base rail 222C. The mounting rail 222I has a height approximately equal to the height of the guard rail 222F. The support 204C is removeably attached to the top of the mounting rail 222I and therefore extends vertically above the guard rail 222F. Furthermore, since the support 204C is attached to the mounting rail 222I, the support 204C is horizontally and vertically positioned outside of the user action region 216. In order to secure the guard rail 222F to the base rail 222C, two vertical support rails 222L are attached near opposite ends of the base rail 222C and near opposite ends of the guard rail 222F so that the vertical support rails 222L extend between the base rail 222C and the guard rail 222F. Horizontal pin rails 222M extend horizontally so as to connect the guard rail 222F to the vertical support rails 222L. This allows for the guard rail 222F to be substantially aligned with an inner edge of the base rail 222C while the vertical support rails 222L and the mounting rail 222I are attached closer to the outer edge of the base rail 222C. Since the base rail 222C is removeably attached to the base rail 222B and since the guard rail 222F is removeably attached to the guard rail 222E, the base rail 222C, the guard rail 222F, the mounting rail 222I, the vertical support rail 222L and two of the horizontal pin rail 222M form an enclosure section 228C of the enclosure 202, wherein the enclosure section 228C is removeably attached when the enclosure 202 is assembled (as shown in FIG. 2).

The VR arena 200 may be sold or shipped with the set of enclosure rails 222 disassembled and the supports 204 detached. The set of enclosure rails 222 are configured to be assembled into the enclosure 202 and the supports 204 are configured to be attached to the enclosure 202 as described above. Accordingly, the set of enclosure rails 222 and the supports 204 may be assembled into the VR arena 200, as shown in FIG. 2, upon arrival at a desired locale. For example, VR arena 200 may be sold or shipped with the enclosure sections 228A, 228B, 228C disassembled and with the supports 204 detached. In this manner, the VR arena 200 can be shipped, which may be required by many commercial shipping companies. Once the VR arena 200 reaches its destination, the enclosure sections 228A, 228B, 228C may be removeably attached to form the enclosure 202 and the supports 204 may be removeably attached to the mounting rails 222G, 222H, 222I in order to assemble the VR arena 200.

The mounting rails 222G, 222H, 222I and the supports 204A, 204B, 204C may be removeably attached in any suitable manner. For example, slide mounting mechanism may be used to removeably attached the mounting rails 222G, 222H, 222I and the supports 204A, 204B, 204C. Additionally or alternatively, male and female coupling mechanisms, screws, bolts, braces, clips, and/or the like may be used to removeably attach the mounting rails 222G, 222H, 222I and the supports 204A, 204B, 204C.

As shown in FIG. 2, the enclosure 202 and the supports 204 define the wiring track 218, which extends around the user action region 216 through the enclosure 202 and the supports 204. In this embodiment, the wiring track 218 extends through each of the supports 204, through each of the mounting rails 222G, 222H, 222I, and through each of the base rails 222A, 222B, 222C. Furthermore, the wiring 220 extends through wiring track 218 so as to connect the VR user devices 208 and the monitors 210 to the VR computer 206. The wiring track 218 thus routes the wiring 220 around the user action region 216 so that the wiring 220 does not obstruct the user action region 216.

However, since the VR arena 200 shown in FIG. 2 is modular, the wiring track 218 includes wiring passages (referred to collectively or generically as wiring passage(s) 230 and specifically as wiring passage(s) 230A-230I). Furthermore, the exemplary wiring 220 shown in FIG. 2 includes wiring segments (referred to collectively or generically as wiring segment(s) 232 and specifically as wiring segment(s) 232A-232I) that are connected to form the wiring 220. Each of these wiring segments 232 is configured to be disconnected, as explained in further detail below. Thus, the wiring 220 does not have to be removed when the VR arena 200 is disassembled.

More specifically, the enclosure section 228A defines the wiring passage 230A and the wiring segment 232A extends through the wiring passage 230A. The wiring segment 232A is configured to be disconnected when the enclosure section 228A is detached from the enclosure 202. For example, the wiring segment 232A may include one or more connectors that connect the wiring segment 232A and are accessible to be disconnected when the enclosure section 228A is detached. In this embodiment, the base rail 222A defines the wiring passage 230A where the wiring passage 230A extends through the base rail 222A. It should be noted that in alternative embodiments, the wiring passage 230A may instead be defined by the guard rail 222D so that the wiring passage 230A extends through the guard rail 222D. The base rail 222A is hollow in this embodiment and thus the wiring passage 230A is provided by the hollow passage inside the base rail 222A.

The enclosure section 228B defines the wiring passage 230B and the wiring segment 232B extends through the wiring passage 230B. The wiring segment 232B is configured to be disconnected when the enclosure section 228B is detached from the enclosure 202. For example, the wiring segment 232B may include one or more connectors that connect the wiring segment 232B and are accessible to be disconnected when the enclosure section 228B is detached. In this embodiment, the base rail 222B defines the wiring passage 230B where the wiring passage 230B extends through the base rail 222B. It should be noted that in alternative embodiments, the wiring passage 230B may instead be defined by the guard rail 222E so that the wiring passage 230B extends through the guard rail 222E. The base rail 222B is hollow in this embodiment and thus the wiring passage 230B is provided by the hollow passage inside the base rail 222B.

The enclosure section 228C defines the wiring passage 230C and the wiring segment 232C extends through the wiring passage 230C. The wiring segment 232C is configured to be disconnected when the enclosure section 228C is detached from the enclosure 202. For example, the wiring segment 232C may include one or more connectors that connect the wiring segment 232C and are accessible to be disconnected when the enclosure section 228C is detached. In this embodiment, the base rail 222C defines the wiring passage 230C where the wiring passage 230C extends through the base rail 222C. It should be noted that in alternative embodiments, the wiring passage 230C may instead be defined by the guard rail 222F so that the wiring passage 230B extends through the guard rail 222F. The base rail 222C is hollow in this embodiment and thus the wiring passage 230C is provided by the hollow passage inside the base rail 222C.

The support 204A defines a wiring passage 230D where the wiring passage 230D extends through the support 204A. The wiring segment 232D extends through the wiring passage 230D. The wiring segment 232D is configured to be disconnected when the support 204A is detached from the enclosure 202. For example, the wiring segment 232D may include one or more connectors that connect the wiring segment 232D and are accessible to be disconnected when the support 204A is detached from the mounting rail 222G of the enclosure 202. In this embodiment, the wiring passage 230D is a channel formed along the exterior surface of the support 204A. The wiring passage 230D is shown extending up and down the support 204A, which in this example is a vertical support rail. Furthermore, the wiring passage 230D is provided on the portion of the exterior surface of the support 204A that faces toward the back of the enclosure 202. In some embodiments, one or more additional wiring passages 230D may be provided on portions the exterior surface of the support 204A facing other directions, such as facing toward the front, toward the exterior, or toward the interior of the enclosure 202. Furthermore, in some embodiments, one or more additional wiring segments 232D may be provided in the additional wiring passages 230D. Finally, additionally or alternatively, the support 204A may be hollow so that one of the wiring segments 232D extends through the hollow passage within the interior of the support 204A.

The support 204B defines at least two wiring passages 230E where each of the wiring passages 230E extend through the support 204B. One of the wiring segments 232E extends through each of the wiring passages 230E. Each of the wiring segments 232E is configured to be disconnected when the support 204B is detached from the enclosure 202. For example, each of the wiring segments 232E may include one or more connectors that connect the wiring segments 232E and are accessible to be disconnected when the support 204B is detached from the mounting rail 222H of the enclosure 202. In this embodiment, each of the wiring passages 230E is a channel formed along the exterior surface of the support 204B. Each of the wiring passages 230E is shown extending up and down the support 204B, which in this example includes a vertical support rail (See FIG. 4 and FIG. 5). In this embodiment, one of the wiring passages 230E is provided on the portion of the exterior surface of the support 204B facing toward the left (when one observes the pole looking from the back to the front of the enclosure 202) and one of the wiring passages 230E is provided on the portion of the exterior surface of the support 204B facing toward right (when one observes the pole looking from the back to the front of the enclosure 202). In some embodiments, one or more additional wiring passages 230E may be provided on portions the exterior surface of the support 204B facing other directions, such as facing toward the exterior or toward the interior of the enclosure 202. Furthermore, in some embodiments, one or more additional wiring segments 232E may be provided in the additional wiring passages 230E. In still other embodiments, only one of the wiring passages 230E is provided on the exterior surface of the support 204B. Finally, additionally or alternatively, the support 204B may be hollow so that one of the wiring segments 232E extends through the hollow passage within the interior of the support 204B.

The support 204C defines the wiring passage 230F where the wiring passage 230F extends through the support 204C. The wiring segment 232F extends through the wiring passage 230F. The wiring segment 232F is configured to be disconnected when the support 204C is detached from the enclosure 202. For example, the wiring segment 232F may include one or more connectors that connect the wiring segment 232F and are accessible to be disconnected when the support 204C is detached from the mounting rail 222I of the enclosure 202. In this embodiment, the wiring passage 230F is a channel formed along the exterior surface of the support 204C. The wiring passage 230F is shown extending up and down the support 204C, which in this example is a vertical support rail. Furthermore, the wiring passage 230F is provided on the portion of the exterior surface of the support 204C that faces toward the back of the enclosure 202. In some embodiments, one or more additional wiring passages 230F may be provided on portions the exterior surface of the support 204C facing other directions, such as facing toward the front, toward the exterior, or toward the interior of the enclosure 202. Furthermore, in some embodiments, one or more additional wiring segments 232F may be provided in the additional wiring passages 230F. Finally, additionally or alternatively, the support 204C may be hollow so that one of the wiring segments 232F extends through the hollow passage within the interior of the support 204C.

The mounting rail 222G defines the wiring passage 230G where the wiring passage 230G extends through the mounting rail 222G. The wiring segment 232G extends through the wiring passage 230G. The wiring segment 232G is configured to be disconnected when the support 204A is detached from the enclosure 202. For example, the wiring segment 232G may include one or more connectors that connect the wiring segment 232G and are accessible to be disconnected when the support 204A is detached from the mounting rail 222G of the enclosure 202. In this embodiment, the wiring passage 230G is a channel formed along the exterior surface of the mounting rail 222G. The wiring passage 230G is shown extending up and down the mounting rail 222G, which in this example is a vertical support rail. Furthermore, the wiring passage 230G is provided on the portion of the exterior surface of the mounting rail 222G that faces toward the back of the enclosure 202. In some embodiments, one or more additional wiring passages 230G may be provided on portions the exterior surface of the mounting rail 222G facing other directions, such as facing toward the front, toward the exterior, or toward the interior of the enclosure 202. Furthermore, in some embodiments, one or more additional wiring segments 232G may be provided in the additional wiring passages 230G. Finally, additionally or alternatively, the mounting rail 222G may be hollow so that one of the wiring segments 232G extends through the hollow passage within the interior of the mounting rail 222G.

The mounting rail 222H defines at least two wiring passages 230H where each of the wiring passages 230H extend through the mounting rail 222H. One of the wiring segments 232H extends through each of the wiring passages 230H. Each of the wiring segments 232H is configured to be disconnected when the support 204B is detached from the enclosure 202. For example, each of the wiring segments 232H may include one or more connectors that connect the wiring segments 232H and are accessible to be disconnected when the support 204B is detached from the mounting rail 222H of the enclosure 202. In this embodiment, each of the wiring passages 230H is a channel formed along the exterior surface of the mounting rail 222H. Each of the wiring passages 230H is shown extending up and down the mounting rail 222H, which in this example includes a vertical support rail (See FIG. 4 and FIG. 5). In this embodiment, one of the wiring passages 230H is provided on the portion of the exterior surface of the mounting rail 222H facing toward the left (when one observes the pole looking from the back to the front of the enclosure 202) and one of the wiring passages 230H is provided on the portion of the exterior surface of the mounting rail 222H facing toward right (when one observes the pole looking from the back to the front of the enclosure 202). In some embodiments, one or more additional wiring passages 230H may be provided on portions the exterior surface of the mounting rail 222H facing other directions, such as facing toward the exterior or toward the interior of the enclosure 202. Furthermore, in some embodiments, one or more additional wiring segments 232H may be provided in the additional wiring passages 230H. In still other embodiments, only one of the wiring passages 230H is provided on the exterior surface of the mounting rail 222H. Finally, additionally or alternatively, the mounting rail 222H may be hollow so that one of the wiring segments 232H extends through the hollow passage within the interior of the mounting rail 222H.

The mounting rail 222I defines the wiring passage 230I where the wiring passage 230I extends through the mounting rail 222I. The wiring segment 232I extends through the wiring passage 230I. The wiring segment 232I is configured to be disconnected when the support 204C is detached from the enclosure 202. For example, the wiring segment 232I may include one or more connectors that connect the wiring segment 232I and are accessible to be disconnected when the support 204C is detached from the mounting rail 222I of the enclosure 202. In this embodiment, the wiring passage 230I is a channel formed along the exterior surface of the mounting rail 222I. The wiring passage 230I is shown extending up and down the mounting rail 222I, which in this example is a vertical support rail. Furthermore, the wiring passage 230I is provided on the portion of the exterior surface of the mounting rail 222I that faces toward the back of the enclosure 202. In some embodiments, one or more additional wiring passages 230I may be provided on portions the exterior surface of the mounting rail 222I facing other directions, such as facing toward the front, toward the exterior, or toward the interior of the enclosure 202. Furthermore, in some embodiments, one or more additional wiring segments 232I may be provided in the additional wiring passages 230I. Finally, additionally or alternatively, the mounting rail 222I may be hollow so that one of the wiring segments 232I extends through the hollow passage within the interior of the mounting rail 222I.

Since the wiring 220 shown in FIG. 2 can be disassembled by disconnecting each of the wiring segments 232, the VR arena 200 can be more easily shipped with the wiring segments 232 within the wiring passages 230. Furthermore, the VR arena 200 may be sold in a disassembled manner with the wiring 220. A user simply would connect the wiring segments 232 during assembly. However, it should be noted that some embodiments of the VR arena 200 may not include the wiring 220 when sold or shipped. Furthermore, as mentioned above, alternative embodiments of the VR arena 200 are not modular but instead all of the components may be rigidly connected or integrated into one another. Accordingly, other embodiments of the wiring 220 may not be capable of being disconnected into the wiring segments 232 and/or the wiring 220 may be fixed within the wiring track 218. These and other embodiments would be apparent to one of ordinary skill in the art in light of this disclosure.

In FIG. 2, the barrier 226 also includes a gate 234 configured to be opened and closed. Accordingly, the barrier 226 further includes the movable gate rail 222N to form the gate 234. More specifically, the guard rails 222D, 222E, 222F are shaped so as to form an open loop when the guard rails 222D, 222E, 222F are removeably attached. Thus, the open loop has a gap 235 between one end of the guard rail 222D and one end of the guard rail 222F, where the gap 235 is diametrically opposed to the guard rail 222E. One end of the movable gate rail 222N is movably attached to the end of the guard rail 222C at the gap 235 so as to swing out of the gap 235 into the user action area 216 when the gate 234 is open. The movable gate rail 222N is also movable into the gap 235 so as to close the open loop and the gap 235 when the gate 234 is closed. More specifically, the movable gate rail 222N can be swung to close the open loop and the gap 235. When the gate 234 is closed, the gate 234 includes a latching mechanism LM that secures the end of the guard rail 222A at the gap 235 to the unattached end of the movable gate rail 222N, which is explained in further detail below. In this example, the base 224 also forms an open loop when the base rails 222A, 222B, 222C are attached so as to form a gap 236 between one end of the base rail 222A and one end of the base rail 222C. In this manner, a user does not have to step over the base 224 when entering the user action region 216.

In the example shown in FIG. 2, the barrier 214 formed by the guard rails 222D, 222E, 222F, 222N, 222O, 222F is a modular guard rail that encloses a circular perimeter of the user action region 216 above the base 224. The circular perimeter enclosed by the modular guard rail is entirely enclosed when the gate 234 is closed but is only partially enclosed when the gate 234 is open due to the gap 235. Furthermore, the base 224 is formed by the guard rails 222A, 222B, 222C to form a modular base rail that encloses a circular perimeter at the bottom of the user action region 216. The circular perimeter enclosed by the modular base rail is partially enclosed. In this example, a radius of the circular perimeter enclosed by the modular base rail is approximately equal to a radius of the circular perimeter enclosed by the modular guard rail. Therefore, the user action region 216 enclosed by the enclosure 202 is cylindrical.

With regard to the enclosure 202, the enclosure section 228B is removeably attached between the enclosure sections 228A, 228C. The enclosure sections 228A, 228C are furthermore symmetric with respect the (central) enclosure section 228B and relative to the user action region 216. More specifically, the enclosure sections 228A, 228C have mirror symmetry.

Referring again to FIG. 2 and FIG. 3, the VR arena 200 includes a computer support structure 238 configured to support the VR computer 206. In this embodiment, the computer support structure 238 is a computer cabinet. The VR computer 206 rests inside the computer support structure 238 and the mouse 212 and the keyboard 214, are resting on the top surface of the computer support structure 238. The computer support structure 238 is mounted to the enclosure 202 and, in this embodiment, the computer support structure 238 is mounted to mounting rail 222H. The computer support structure 238 may be mounted to be accessible outside the user action region 216 and/or so that the computer support structure 238 does not obstruct the user action region 216. For example, the computer support structure 238 shown in FIG. 2 is mounted so that the computer support structure 238 extends horizontally from the back of the mounting rail 222H so that the front of the computer support structure 238 faces away from the user action region 216.

Furthermore, a mount 240 is mounted to the support 204B. In this embodiment, the mount 240 is mounted so that the mount 240 is on the back side of the mounting rail 222H and faces away from the user action region 216. Also, the monitor 210B is mounted to the support 204B. In this example, the support 204B includes a vertical mounting rail and a horizontal mounting rail, as explained in further detail below with respect to FIGS. 4 and 5. The mount 240 is configured to support the VR headset 208A and the VR controllers 208B, 208C. In this embodiment, the VR head set 208A and the VR controllers 208B, 208C may be suspended on the mount when the VR system 205 is not in use. The wiring segments 232E, 232H of the wiring 220 connects the VR headset 208A, the VR controller 208B, 208C, and the monitor 210B to the VR computer 206 and the wiring passages 230E, 232H of the wiring track 218 ensures that the wiring segments 232E, 232H are provided around the user action region 216 so as not to provide an obstruction to a user.

With regard to the VR tracking sensor 208D, 208E, the VR tracking sensor 208D is mounted to the support 204A while the VR tracking sensor 208E is mounted to the support 204C. In addition, the monitors 210A is mounted to the support 204A while the monitor 210C is mounted to the support 204C. As mentioned above, the enclosure sections 228A, 228C are symmetric with respect the (central) enclosure section 228B and relative to the user action region 216. Furthermore, the supports 204A, 204C are both vertical mounting rails of the same height. The supports 204A, 204C are mounted to the mounting rails 222G, 222I, respectively. Thus, the supports 204A, 204C are positioned symmetrically with respect to the (central) enclosure section 228B and relative to the user action region 216. In this embodiment, the supports 204A, 204C are positioned to have mirror symmetry. Accordingly, if one were to draw a reference line from the middle of user action region 216 to the mounting rail 222H, an angle between the horizontal position of the support 204A and the reference line and an angle between the horizontal position of the support 204C and the reference line would have the same magnitude but opposite polarity. As shown in FIG. 2, the VR tracking sensor 208D is mounted at the top of the support 204A and the VR tracking sensor 208E is mounted at the top of the support 204C. The VR tracking sensor 208D is connected to the wire segment 232D and the VR tracking sensor 208E is connected to the wire segment 232F. Furthermore, both of the VR tracking sensors 208D, 208E are mounted so as to face the center of the user action regions 216. In this manner, the supports 204A, 204C may be positioned so as to optimize the tracking operation of the VR tracking sensors 208D, 208E, which in this example are lighthouse tracking sensors for the VIVE VR system 205.

Alternative embodiments of the VR arena 200 may use other symmetric arrangements and/or a different number of supports 204, or a different type of support 204. For example, other types of VR systems may use triangularization techniques and thus supports (like the supports 204) may have horizontal positions that are one hundred and twenty degrees apart. These and other arrangements would be apparent to one of ordinary skill in the art in light of this disclosure.

Figure 4:
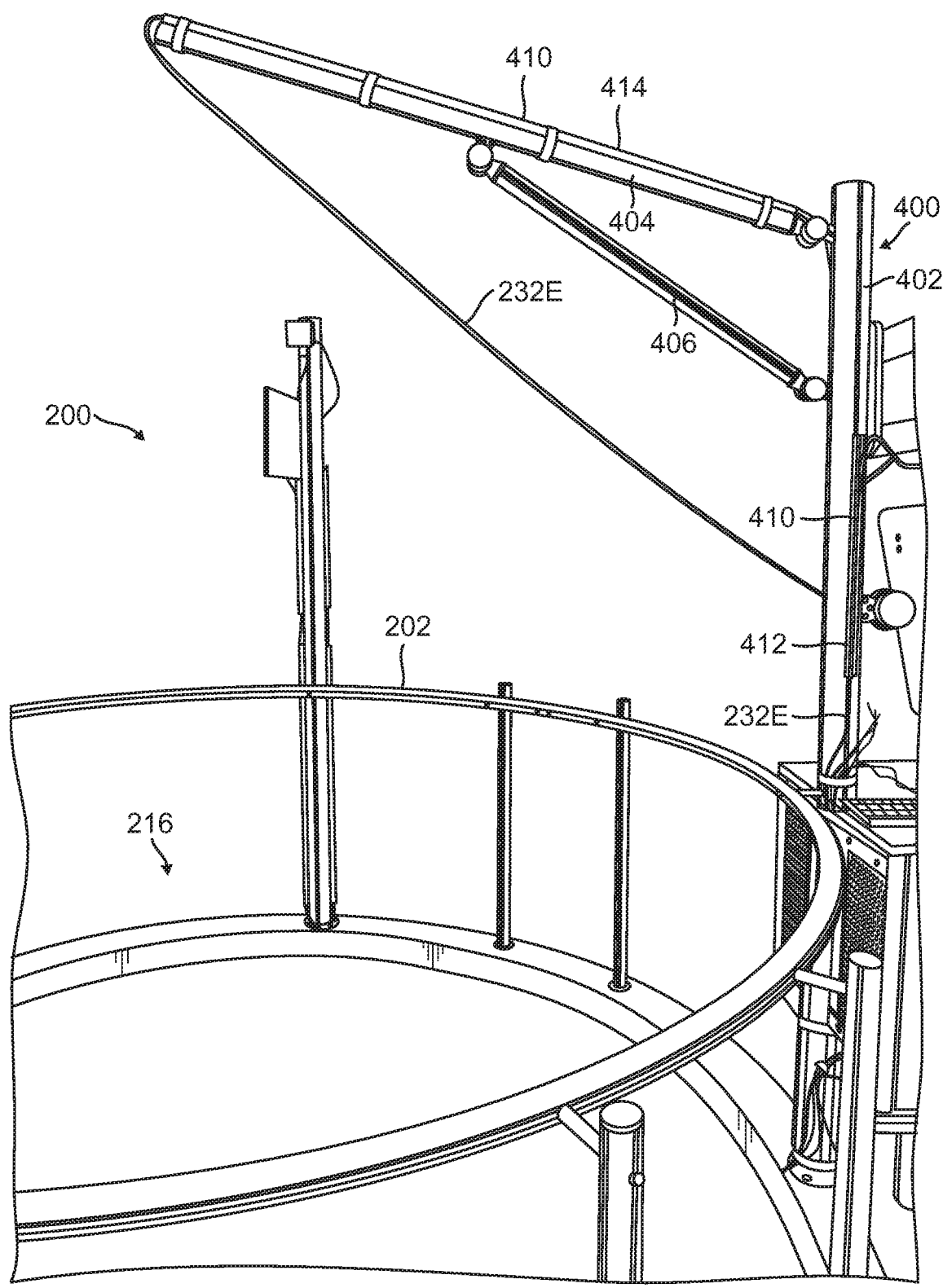
FIG. 4 illustrates one embodiment of the support with the mount for the VR headset and VR controllers shown in FIG. 2.

FIG. 4 illustrates one embodiment of a support 400 where the support 400 is one example of the support 204B described above with respect to FIG. 2. The support 400 includes a vertical rail 402 configured to be removeably attached to the enclosure 202 and a horizontal rail 404 movably coupled to the vertical rail 402. As shown in FIG. 4, the horizontal rail 404 extends over the user action region 216 when the vertical rail 402 is removeably attached to the enclosure 202. In this embodiment, a hinge connects one end of the horizontal rail 404 near the top of the vertical rail 402 so that the vertical height of the other end of the horizontal rail 404 can be adjusted. A hinged support rail 406 is also attached between the horizontal rail 404 and the vertical rail 402. The hinged support rail 406 helps support the horizontal rail 402 while still allowing the unattached end of the horizontal rail 404 to be adjusted.

The support 400 includes wiring passages 410, which are embodiments of the wiring passages 232E described above with respect to FIG. 2. In this embodiment, the wiring passages 410 are discontinuous to allow for the horizontal rail 404 to be movably attached to the vertical rail 402 with the hinge. With respect to the vertical rail 402, each of the wiring passages 410 includes wiring passage sections 412 [on the left side (not explicitly shown) and right side of the exterior surface of the vertical rail 402] that extends through the vertical rail 402 and a wiring passage section 414 that extends through the horizontal rail 404. Thus, each of the wiring passage sections 412 is discontinuous with the wiring passage section 414 at the junction between the horizontal rail 404 and the vertical rail 402.

As shown in FIG. 4, each of the wiring segments 232E extends through one of the wiring passage sections 412 [on the left side (not explicitly shown) and right side of the exterior surface of the vertical rail 402] and then are combined into a single wiring segment 232E that extends through the wiring passage section 414. The wiring segment 232E is long enough to continue after passing through the wiring passage section 414 so as to provide slack. The horizontal rail 404 may have a length approximately equal to the radius of the enclosure 202 so that the unattached end of the horizontal rail 404 hangs approximately over the center of the user action region 216. In this manner, the VR headset 208A can be worn by a user in the user action region 216 without the wiring segment 232E presenting an obstruction in the user action region 216. Furthermore, the horizontal rail 404 can be movably adjusted based on the height of the user.

In this embodiment, the wiring passage section 414 is formed as a channel on the exterior surface at the top of the horizontal rail 404. The wiring passage section 414 extends along the length of the horizontal rail 404. The top of the wiring passage section 414 is open but overhanging flanges help maintain the wiring segments 232E in the wiring passage section 414. In addition, various straps are secured around the horizontal rail 404 to help maintain the wiring segment 232E in the wiring passage section 414.

Figure 5:
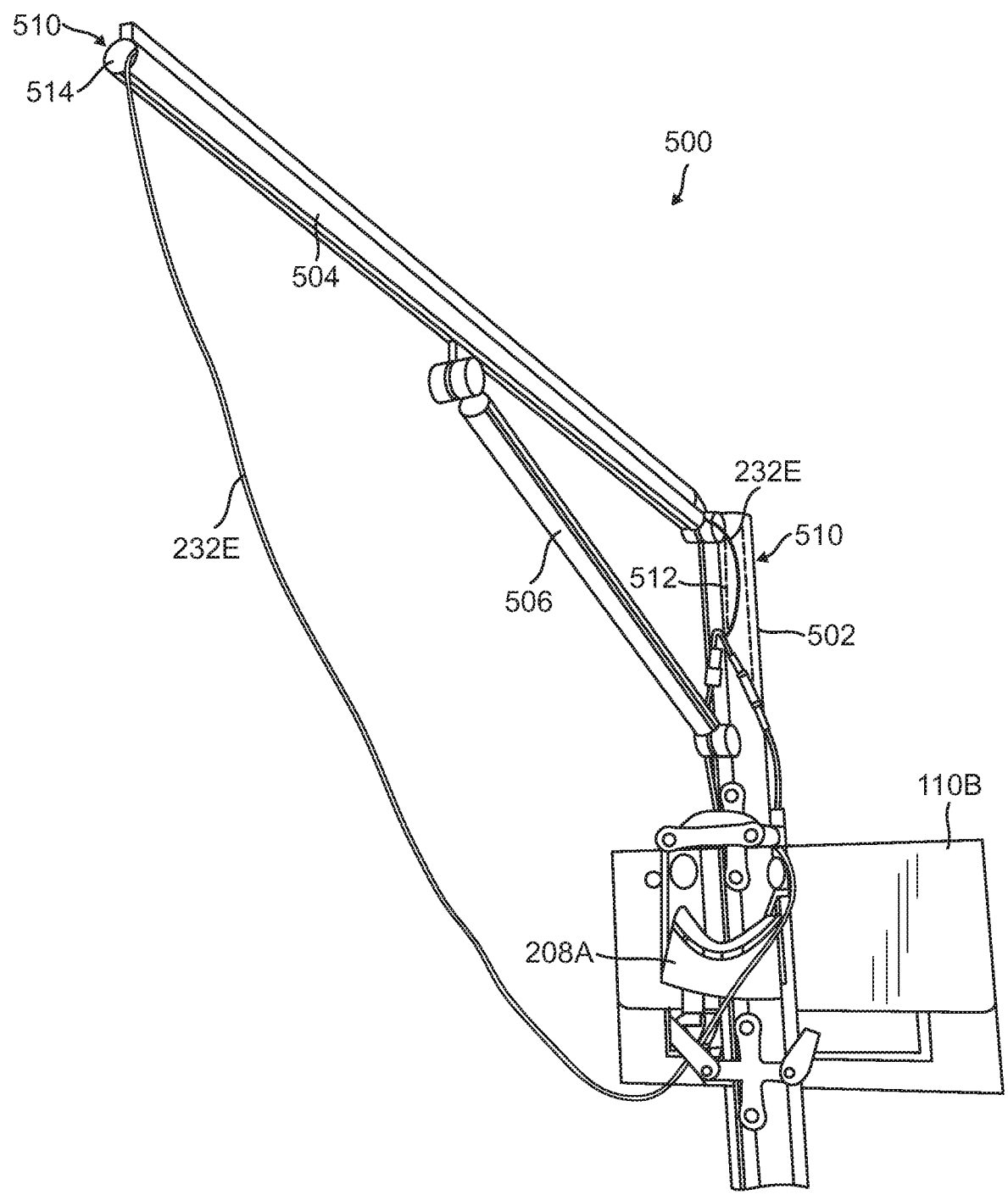
FIG. 5 illustrates another embodiment of the support with the mount for the VR headset and VR controllers shown in FIG. 2.

FIG. 5 illustrates one embodiment of a support 500 where the support 500 is one example of the support 204B discussed above with respect to FIG. 2. The support 500 includes a vertical rail 502 configured to be removeably attached to the enclosure 202 and a horizontal rail 504 movably coupled to the vertical rail 502. As shown in FIG. 5, the horizontal rail 504 extends over the user action region 216 when the vertical rail 502 is removeably attached to the enclosure 202. In this embodiment, a hinge (not shown?) connects one end of the horizontal rail 504 near the top of the vertical rail 502 so that the vertical height of the other end of the horizontal rail 504 can be adjusted. A hinged support rail 506 is also attached between the horizontal rail 504 and the vertical rail 502. The hinged support rail 506 helps support the horizontal rail 504 while still allowing the height of the unattached end of the horizontal rail 504 to be adjusted.

The support 500 includes a wiring passage 510, which is an alternative embodiment of the wiring passage(s) 232E described above with respect to FIG. 2. In this embodiment, the wiring passage 232E is discontinuous to allow for the horizontal rail 504 to be movably attached to the vertical rail 502 with the hinge. Furthermore, the wiring passage 510 includes a wiring passage section 512 that extends through the vertical rail 502 and a wiring passage section 514 that extends through the horizontal rail 504. The vertical rail 502 is hollow and the wiring passage section 512 is provided by the hollow passage in the interior of the vertical rail 502. The wiring passage section 512 and the wiring passage section 514 are discontinuous at the junction between the horizontal rail 504 and the vertical rail 502.

As shown in FIG. 5, the wiring segment 232E extends through the wiring passage section 512, through the wiring passage section 514, and continues to provide slack. The horizontal rail 504 may have a length approximately equal to the radius of the enclosure 202 so that the unattached end of the horizontal rail 504 hangs approximately over the center of the user action region 216. In this manner, the VR headset 208A can be worn by a user in the user action region 216 without the wiring segment 232 presenting an obstruction in the user action region 216. Furthermore, the horizontal rail 504 can be movably adjusted based on the height of the user. The wiring passage section 514 of the horizontal rail 504 is formed by the hollow passage inside of the horizontal rail 504, which extends along the length of the horizontal rail 504. The wiring segment 232E simply extends out of the unattached end of the horizontal rail 504, which in this example is an open end.

Figure 6:
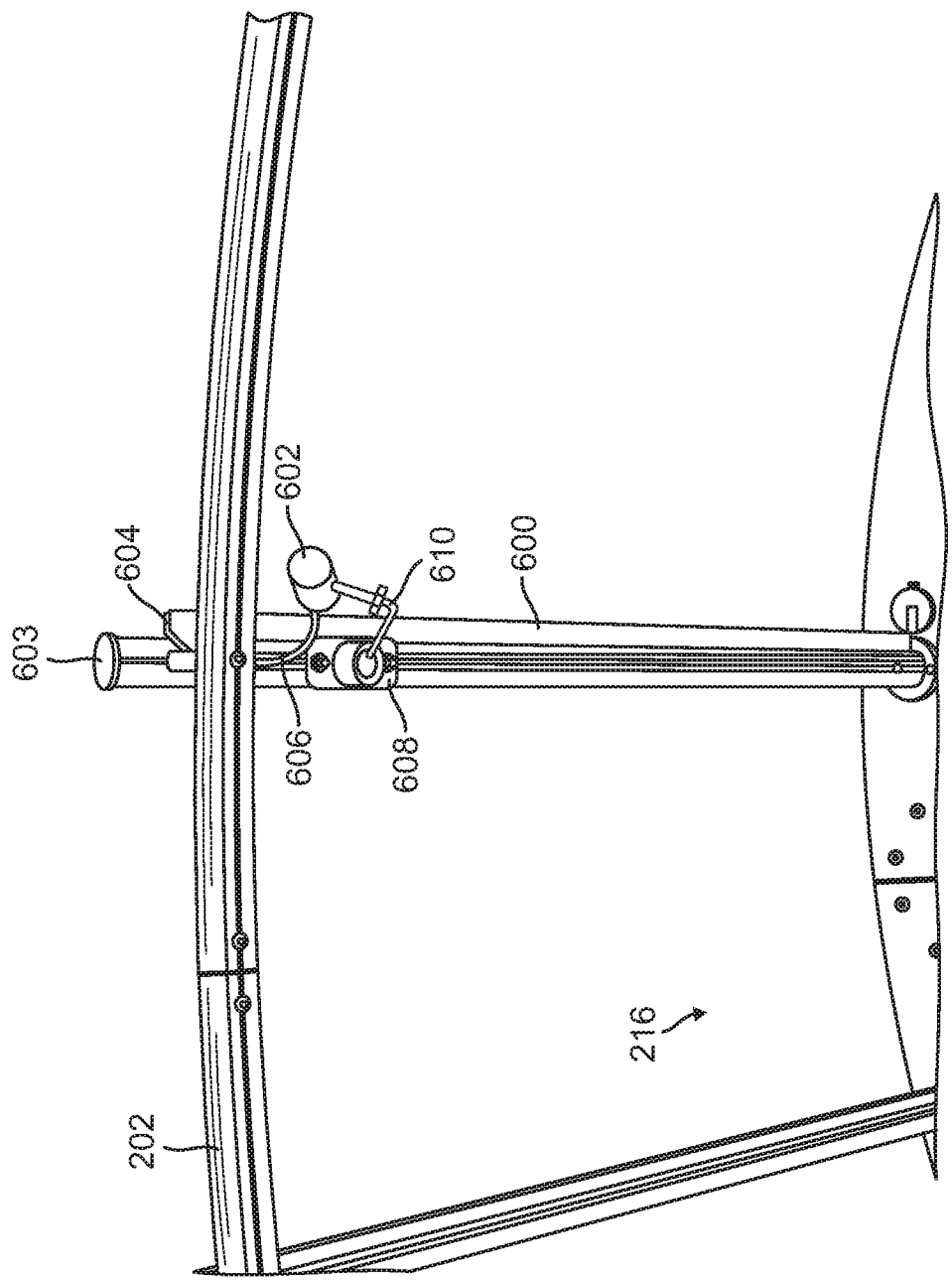
FIG. 6 illustrates another example of a support that may be used with the VR arena shown in FIG. 2.

FIG. 6 illustrates another embodiment of a support 600 and another embodiment of a VR tracking sensor 602. In this embodiment, the VR tracking sensor 602 is a sensor for the Oculus Rift system, which operates differently than the VR tracking sensors of the VIVE VR system 205. For example, the Oculus Rift system may use triangularization. Therefore, the optimal position of the VR tracking sensor 602 relative to the user action region 216 is different than the VR tracking sensors 108D, 108E, 208D, 208E. The support 600 shown in FIG. 6 is removeably attached to a vertical support rail 603, which is an example of one of the vertical support rails 222J, 222K, 222L. In this embodiment, the support 600 is a hollow bar rail that is mounted on and extends along the length of the vertical support rail 603. The support 600 is mounted along the surface of the vertical support rail 603 and is secured to the vertical support rail with screws, which are inserted into a ridge in the front of the vertical support rail 603.

A wiring segment 606 of one embodiment of the wiring 220 extends through the wiring passage 604 and connects to the VR tracking sensor 602. The support 600 defines the wiring passage 604 where the wiring passage 604 extends through the support 600 (the top of the wiring passage 604 can be seen in FIG. 6). In this embodiment, the VR tracking sensor 602 is attached to a mount 608 and a movable arm 610. The mount 608 is mounted to the vertical support rail 603 with screws, which are inserted into the ridge in the front of the vertical support rail 603. One end of the movable arm 610 is movably attached to the mount while the VR tracking sensor 602 is mounted on the other end of the movable arm 610. The movable arm 610 thereby allows for the orientation of the VR tracking sensor 602 to be adjusted.

Figure 7:
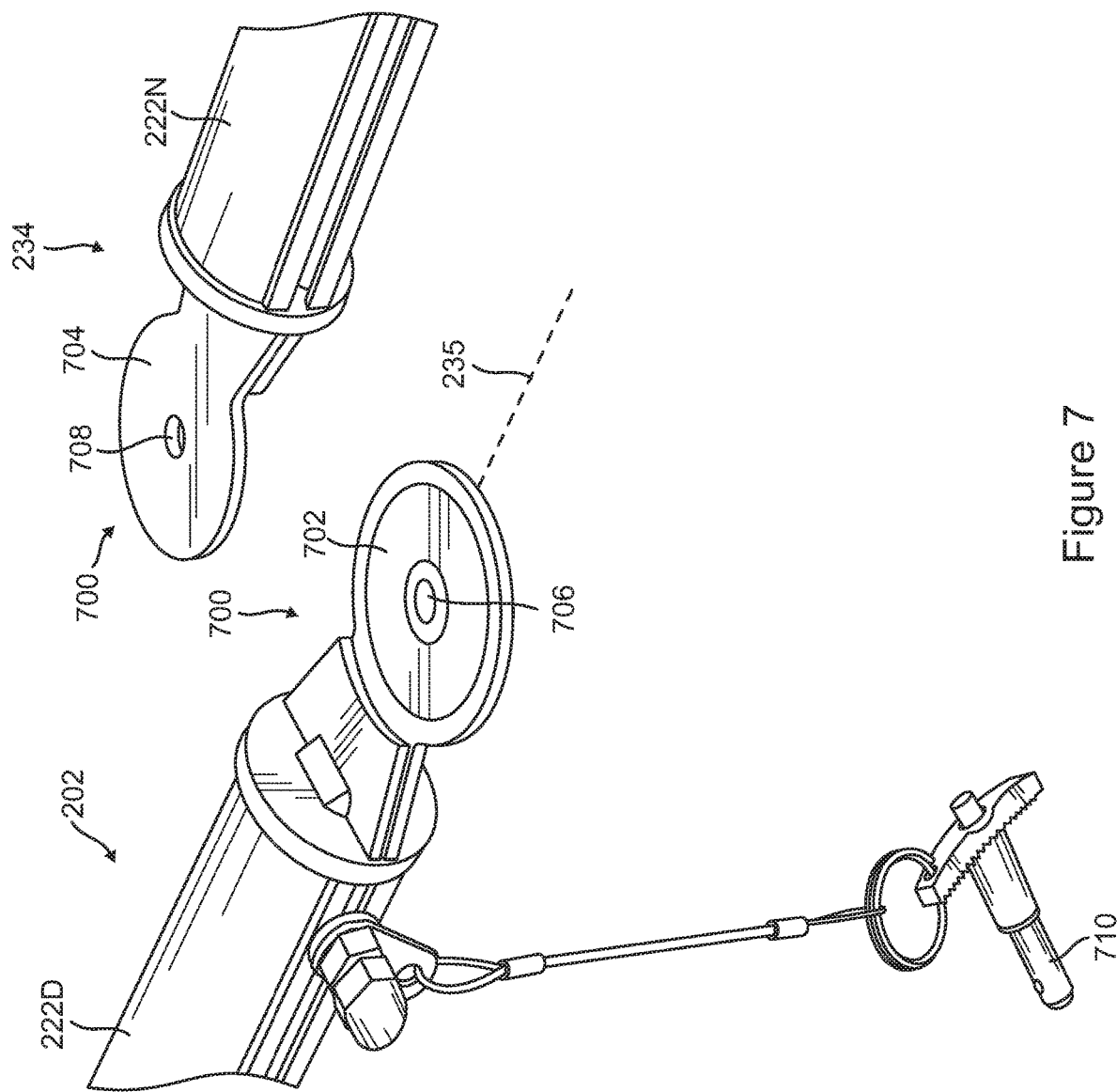
FIG. 7 illustrates an exemplary latching mechanism that may be provided to maintain a gate of an enclosure of the VR arena shown in FIG. 2 secured in the closed position.

FIG. 7 illustrates one embodiment of a latching mechanism 700 where the latching mechanism 700 is one example of the latching mechanism of the gate 234 discussed above with respect to FIG. 2. In this embodiment, the latching mechanism 700 includes an element 702 that is attached to the end of the guard rail 222D at the gap 235 and an element 704 attached to the unattached end of the movable gate rail 222N. In this embodiment, the element 702 is a circular panel attached to the end of the guard rail 222D so that the circular panel is substantially parallel with the ground. The element 704 is also a circular panel that is attached to the unattached end of the movable gate rail 222N so that the circular panel is substantially parallel with the ground. In alternative embodiments, the elements 702, 704 may have any other suitable shape.

As shown in FIG. 7, the element 702 defines an aperture 706 and the element 704 defines an aperture 708. When the gate 234 is in the closed position, the movable gate rail 235 is moved into and thereby closes the gap 235. Accordingly, the element 704 is provided over the element 702 such that the aperture 708 is aligned over the aperture 706 when the gate 234 is in the closed position. The latching mechanism further includes a pin 710, where the pin 710 is configured to be inserted through the aperture 708 and the aperture 706 so that the gate 234 is secured in the closed position. To open the gate 234, the pin 710 may simply be removed so that the movable gate rail 222N can be moved out of the gap 235.

Those skilled in the art will recognize improvements and modification to the preferred embodiments of the present disclosure. All such improvements and modifications are considered within the scope of the concepts disclosed herein and the claims that follow.

What is claimed is:

1. A virtual reality (VR) arena, comprising:
    an enclosure that encloses a user action region;
    a first support attached to the enclosure, wherein the enclosure and the first support define a wiring track that extends through the enclosure and the first support; and
    wherein the first support is attached to the enclosure outside the user action region and the enclosure is configured to constrain a user to the user action region so that a user does not bump into the first support while in the user action region.

2. The VR arena of claim 1, further comprising wiring that extends through the wiring track, wherein the wiring is operable to connect a VR computer to at least one VR user device.

3. The VR arena of claim 2, wherein:
    the first support is detachable from the enclosure;
    the wiring track comprises a wiring passage;
    the first support defines the wiring passage; and
    the wiring includes a wiring segment that extends through the wiring passage, wherein the wiring segment is configured to be disconnected when the first support is detached from the enclosure.

4. The VR arena of claim 2, wherein:
the wiring comprises wiring segments that are connected to form the wiring;
the wiring track comprises wiring passages;
the enclosure comprises enclosure sections that are removeably attached to one another; and
for each enclosure section of the enclosure sections, the enclosure section defines one of the wiring passages, one of the wiring segments extends through the one of the wiring passages, and the one of the wiring segments is configured to be disconnected when the enclosure section is detached from the enclosure.

5. The VR arena of claim 4, wherein:
the enclosure comprises a base, wherein the base comprises base rails removeably attached to form the base of the enclosure; and
for each of the enclosure sections, the enclosure section includes one of the base rails and the one of the base rails defines the one of the wiring passages.

6. The VR arena of claim 5, wherein:
the enclosure further comprises a barrier attached to the base, wherein the barrier comprises guard rails removeably attached to form the barrier; and
for each of the enclosure sections, the enclosure section includes one of the guard rails attached above the one of the base rails.

7. The VR arena of claim 1, further comprising a computer support structure configured to support a VR computer, wherein the computer support structure is mounted on the enclosure.

8. The VR arena of claim 7, further comprising:
the VR computer supported by the computer support structure;
a first VR user device mounted on the first support; and
wiring that extends through the wiring track and connects the VR computer to the first VR user device.

9. The VR arena of claim 1, further comprising a second support that is attached to the enclosure, wherein:
the second support further defines the wiring track such that the wiring track further extends through the enclosure to the second support; and
the first support and the second support are positioned symmetrically with respect to the user action region.

10. The VR arena of claim 9, further comprising a computer support structure configured to support a VR computer:
the computer support structure is mounted on the enclosure;
a first VR tracking sensor mounted on the first support;
a second VR tracking sensor mounted on the second support; and
wiring that extends through the wiring track to the computer support structure, wherein the wiring is connected to first VR tracking sensor and the second VR tracking sensor.

11. The VR arena of claim 6, wherein the first support defines a wiring passage of the wiring track and the first support comprises:
a vertical rail attached to the enclosure; and
a horizontal rail movably coupled to the vertical rail so as to extend over the user action area, wherein the wiring passage extends through the vertical rail and the horizontal rail.

12. The VR arena of claim 1, wherein the enclosure comprises a gate for the user action area and a latching mechanism that is configured to secure the gate in a closed position.

13. The VR arena of claim 12, wherein the latching mechanism comprises:
a first element that defines a first aperture;
a second element that defines a second aperture, wherein the first element is configured to be provided over the second element such that the first aperture is aligned over the second aperture when the gate is in the closed position; and
a pin configured to be inserted through the first aperture and the second aperture so that the gate is secured in the closed position.

14. A virtual reality (VR) arena, comprising:
a set of enclosure rails configured to be assembled into an enclosure that encloses a user action region;
one or more supports configured to be attached to the enclosure, wherein the enclosure and the one or more supports define a wiring track that extends through the enclosure and the one or more supports when the enclosure is assembled and the one or more supports are attached to the enclosure; and
wherein the one or more supports are attached to the enclosure outside the user action region and the enclosure is configured to constrain a user to the user action region so that a user does not bump into the one or more supports while in the user action region.

15. The VR arena of claim 14, further comprising wiring configured to extend through the wiring track, wherein the wiring is operable to connect a VR computer to at least one VR user device, wherein:
the wiring comprises wiring segments configured to be connected;
the wiring track has wiring passages;
the one or more supports are configured to be removeably attached to the enclosure;
for each support of the one or more supports, the support defines one of the wiring passages and one of the wiring segments extends through the one of the wiring passages defined by the support;
the set of enclosure rails are configured to form enclosure sections, wherein the enclosure sections are configured to be removeably attached in order to assemble the enclosure; and
for each enclosure section of the enclosure sections, the enclosure section defines one of the wiring passages and one of the wiring segments extends through the one of the wiring passages defined by the enclosure section.

16. The VR arena of claim 14, further comprising a VR computer, a first VR user device, wiring segments, and a computer support structure, wherein:
the computer support structure configured to support the VR computer;
the computer support structure is configured to be mounted to the enclosure;
the one or more supports comprise a first support that is removeably attachable to the enclosure;
the wiring track extends through the first support when the first support is attached to the enclosure;
the first VR user device is configured to be mounted to the first support; and
the wiring segments are connectable to form wiring that extends through the wiring track and connects the VR computer to the first VR user device when the first support is attached to the enclosure and the VR computer is supported by the computer support structure.

17. The VR arena of claim 16, further comprising a second VR user device wherein:
- the one or more supports further comprise a second support that is removeably attachable to the enclosure;
- the wiring track further extends through the second support when the second support is attached to the enclosure;
- the wiring is further operable to connect the VR computer to the second VR user device when the second support is attached to the enclosure;
- the second VR user device is configured to be mounted to the second support;
- the wiring segments are connectable to form wiring that further extends through the wiring track and connects the VR computer to the second VR user device when the first support is attached to the enclosure and the VR computer is supported by the computer support structure; and
- the first support and the second support are positioned symmetrically with respect to the user action region when the first support and the second support are attached to the disclosure.

18. The VR arena of claim 16, wherein:
- the first VR user device comprises a VR headset;
- the first support defines a wiring passage in the wiring track and the first support comprises:
  - a vertical rail configured to be removeably attached to the enclosure; and
  - a horizontal rail movably coupled to the vertical rail so as to extend over the user action area when the vertical rail is attached to the enclosure, wherein the wiring passage extends through the vertical rail and the horizontal rail.

19. The VR arena of claim 14, wherein the set of enclosure rails comprise at least one guard rail configured to maintain a user in the user action region of the enclosure.

* * * * *